(12) United States Patent
Shiohara

(10) Patent No.: US 11,652,276 B2
(45) Date of Patent: May 16, 2023

(54) INFORMATION APPARATUS AND METHOD FOR POSITION DETECTION USING COMMUNICATED ANTENNA CONFIGURATION

(71) Applicant: CANON KABUSHIKI KAISHA, Tokyo (JP)

(72) Inventor: Tetsuya Shiohara, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 386 days.

(21) Appl. No.: 16/885,723

(22) Filed: May 28, 2020

(65) Prior Publication Data

US 2020/0381805 A1    Dec. 3, 2020

(30) Foreign Application Priority Data

May 31, 2019    (JP) .............................. JP2019-103173

(51) Int. Cl.
  *G01S 13/42*    (2006.01)
  *H04W 84/12*    (2009.01)
  *H01Q 1/24*     (2006.01)
  (Continued)

(52) U.S. Cl.
  CPC ............. *H01Q 1/241* (2013.01); *G01S 13/42* (2013.01); *H01Q 21/24* (2013.01); *H01Q 21/28* (2013.01);
  (Continued)

(58) Field of Classification Search
  CPC ........ H01Q 1/241; H01Q 21/24; H01Q 21/28; G01S 13/42; G01S 2013/468;
  (Continued)

(56) References Cited

U.S. PATENT DOCUMENTS

| | | | |
|---|---|---|---|
| 2016/0105761 A1* | 4/2016 | Polo ................... | H04W 4/80 455/41.2 |
| 2017/0026794 A1* | 1/2017 | Baker ................. | H04W 40/244 |
| 2017/0038923 A1* | 2/2017 | Tsuzuki .............. | G06F 3/0482 |
| 2017/0214117 A1* | 7/2017 | Gracyk ............... | G01S 13/878 |

(Continued)

FOREIGN PATENT DOCUMENTS

JP    2017037427 A    2/2017

OTHER PUBLICATIONS

XP55734042: Bluetooth Core Specification v5.1 Feature Overview, Jan. 28, 2019 (Jan. 28, 2019) Retrieved from the Internet URL:https://www.bluetooth.com/wp-content/uploads/2019/03/1901_Feature_Overview_Brief_FINAL.pdf.

(Continued)

*Primary Examiner* — Donald H B Braswell
(74) *Attorney, Agent, or Firm* — Venable LLP

(57) ABSTRACT

There is provided an information processing apparatus configured to execute communication with a communication apparatus including a plurality of antennas, comprising: communication unit for receiving a signal transmitted from each of the plurality of antennas of the communication apparatus; acquisition unit for acquiring information concerning a distance between the plurality of antennas of the communication apparatus, which is included in the received signal; and identifying unit for identifying information concerning an angle between the information processing apparatus and the communication apparatus based on the acquired information concerning the distance between the plurality of antennas.

13 Claims, 15 Drawing Sheets

| Identifier | IDENTIFIER REPRESENTING START OF ANTENNA LAYOUT INFORMATION |
|---|---|
| Length | SIZE OF ANTENNA LAYOUT INFORMATION |
| Type | 0: EVENLY LINEARLY ARRANGED<br>1: EVENLY PLANARLY ARRANGED |
| XCount | NUMBER OF ANTENNAS IN X DIRECTION |
| YCount | NUMBER OF ANTENNAS IN Y DIRECTION |
| Unit | 0: 1/10 mm<br>1: 1 mm<br>2: 10 mm |
| XLength | LENGTH OF ANTENNA ARRANGEMENT AREA IN X DIRECTION |
| YLength | LENGTH OF ANTENNA ARRANGEMENT AREA IN Y DIRECTION |

(51) Int. Cl.
  *H01Q 21/24* (2006.01)
  *H01Q 21/28* (2006.01)
  *G01S 13/46* (2006.01)

(52) U.S. Cl.
  CPC ....... *H04W 84/12* (2013.01); *G01S 2013/468* (2013.01)

(58) Field of Classification Search
  CPC ........ G01S 5/0284; G01S 5/0252; G01S 5/10; G01S 5/14; G01S 3/46; H04W 84/12; H04W 4/023; H04W 4/80; H04N 2201/0055; H04N 2201/006; H04N 1/00204; H04N 1/00307; H04N 1/00127
  See application file for complete search history.

(56) References Cited

U.S. PATENT DOCUMENTS

2018/0292518 A1* 10/2018 Chu .................... H04W 72/121
2020/0200851 A1* 6/2020 Homsky ................. G01S 1/14

OTHER PUBLICATIONS

XP55734050: Ken Lam, "Bluetooth 5.1 Direction Finding Theory and Practice", May 30, 2019 (May 30, 2019) Retrieved from the Internet: URL:https://www.bluetooth.com/wp-content/uploads/2019/05/BTAsia/1145-NORDIC-Bluetooth-Asia-2019Bluetooth-5.1-Direction-Finding-Theory-and-Practice-v0.pdf.
Extended European Search Report issued dated Oct. 7, 2020 in counterpart European Patent Application No. 20175391.0.

* cited by examiner

FIG. 11

```
SERVICE
00000000-0000-1000-1000-00405f9b34fb
    CHARACTERISTIC
    00000000-0000-2000-1000-00405f9b34fb
        DESCRIPTOR
        00000000-0000-2000-1000-00405f9b3400
```

FIG. 12

| Service UUID | Service NAME | Characteristic UUID | Characteristic NAME | Service READ ENABLE | Service WRITE ENABLE | Characteristic READ ENABLE | Characteristic WRITE ENABLE | Characteristic INDI-CATABLE | VALUE | PAIRING NEED |
|---|---|---|---|---|---|---|---|---|---|---|
| 0x1801 | GATT Service | 0x2A05 | Service Changed | ○ | | | | ○ | 0 | |
| | | 0x2B2A | Database Hash | | | ○ | | | F0 CA 2D 48 EC F5 8B AC 8A AA 30 BB B9 FB A9 90 | |
| 0x180A | Device Information | 0x2A29 | Manufacturer Name String | ○ | | ○ | | | Printer Device | |
| | | 0x2A24 | Hardware Revision String | | | ○ | | | 1010_AAA | |
| | | 0x2A25 | Firmware Revision String | | | ○ | | | 2030000 | |
| | | 0x2A26 | Software Revision String | | | ○ | | | 0001 | |
| 00000000-0000-1000-1000-004059b34fb | IJ Original | 00000000-0000-2000-1000-004059b34fb | SSID | | | ○ | | | Printer SSID | ○ |
| | | 00000000-0000-2000-1000-004059b34fc | PASSWORD | | | ○ | | | aaaabbbb | ○ |

FIG. 14

| Identifier | IDENTIFIER REPRESENTING START OF ANTENNA LAYOUT INFORMATION |
|---|---|
| Length | SIZE OF ANTENNA LAYOUT INFORMATION |
| Type | 0: EVENLY LINEARLY ARRANGED<br>1: EVENLY PLANARLY ARRANGED |
| XCount | NUMBER OF ANTENNAS IN X DIRECTION |
| YCount | NUMBER OF ANTENNAS IN Y DIRECTION |
| Unit | 0: 1/10 mm<br>1: 1 mm<br>2: 10 mm |
| XLength | LENGTH OF ANTENNA ARRANGEMENT AREA IN X DIRECTION |
| YLength | LENGTH OF ANTENNA ARRANGEMENT AREA IN Y DIRECTION |

FIG. 15A
ANTENNA LAYOUT INFORMATION : 0xFF060003011E
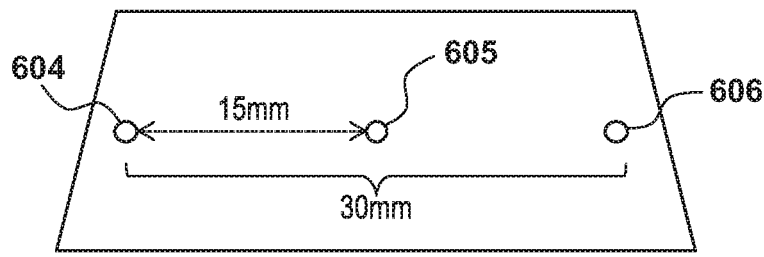
FIG. 15B
ANTENNA LAYOUT INFORMATION : 0xFF08010403011E0A
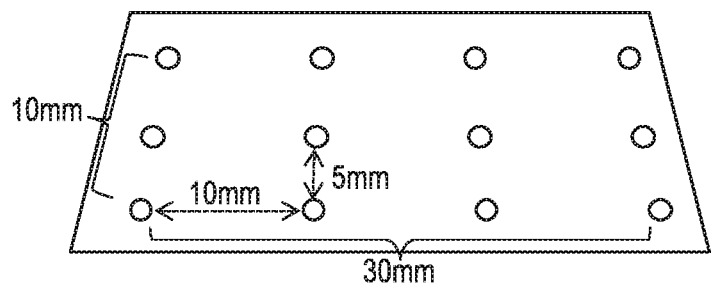
FIG. 16A
ANTENNA LAYOUT INFORMATION OF FIRST ADVERTISEMENT INFORMATION  1601
| Identifier | Length | Number | Type | XCount | YCount |
FIG. 16B
ANTENNA LAYOUT INFORMATION OF SECOND ADVERTISEMENT INFORMATION  1602
| Identifier | Length | Number | Unit | XLength | YLength |

INFORMATION APPARATUS AND METHOD FOR POSITION DETECTION USING COMMUNICATED ANTENNA CONFIGURATION

BACKGROUND OF THE INVENTION

Field of the Invention

The present invention relates to an information processing apparatus, an information processing method, and a position detection system.

Description of the Related Art

There exists a technique of identifying the distance between devices using Bluetooth communication (see Japanese Patent Laid-Open No. 2017-037427).

In the conventional technique, the distance between devices is identified based on a signal strength measured when one of the devices transmits a signal, and the other receives it. However, there is demand for more accurate position detection.

SUMMARY OF THE INVENTION

An aspect of the present invention is to eliminate the above-mentioned problem with conventional technology.

A feature of the present invention is to provide a technique of performing more accurate position detection.

One aspect of the present invention provides an information processing apparatus configured to execute communication with a communication apparatus including a plurality of antennas, comprising: communication unit configured to receive a signal transmitted from each of the plurality of antennas of the communication apparatus; acquisition unit configured to acquire information concerning a distance between the plurality of antennas of the communication apparatus, which is included in the received signal; and identifying unit configured to identify information concerning an angle between the information processing apparatus and the communication apparatus based on the acquired information concerning the distance between the plurality of antennas.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a view showing the data format of GATT;

FIG. 12 is a table showing an example of GATT data stored in the short distance wireless communication unit;

FIG. 14 is a view showing an example of antenna layout information;

FIGS. 15A and 15B are views showing the relationship between antenna layout information and the antenna arrangement of the short distance wireless communication unit;

FIGS. 16A and 16B are views showing divisional transmission of antenna layout information;

DESCRIPTION OF THE EMBODIMENTS

Figure 1:
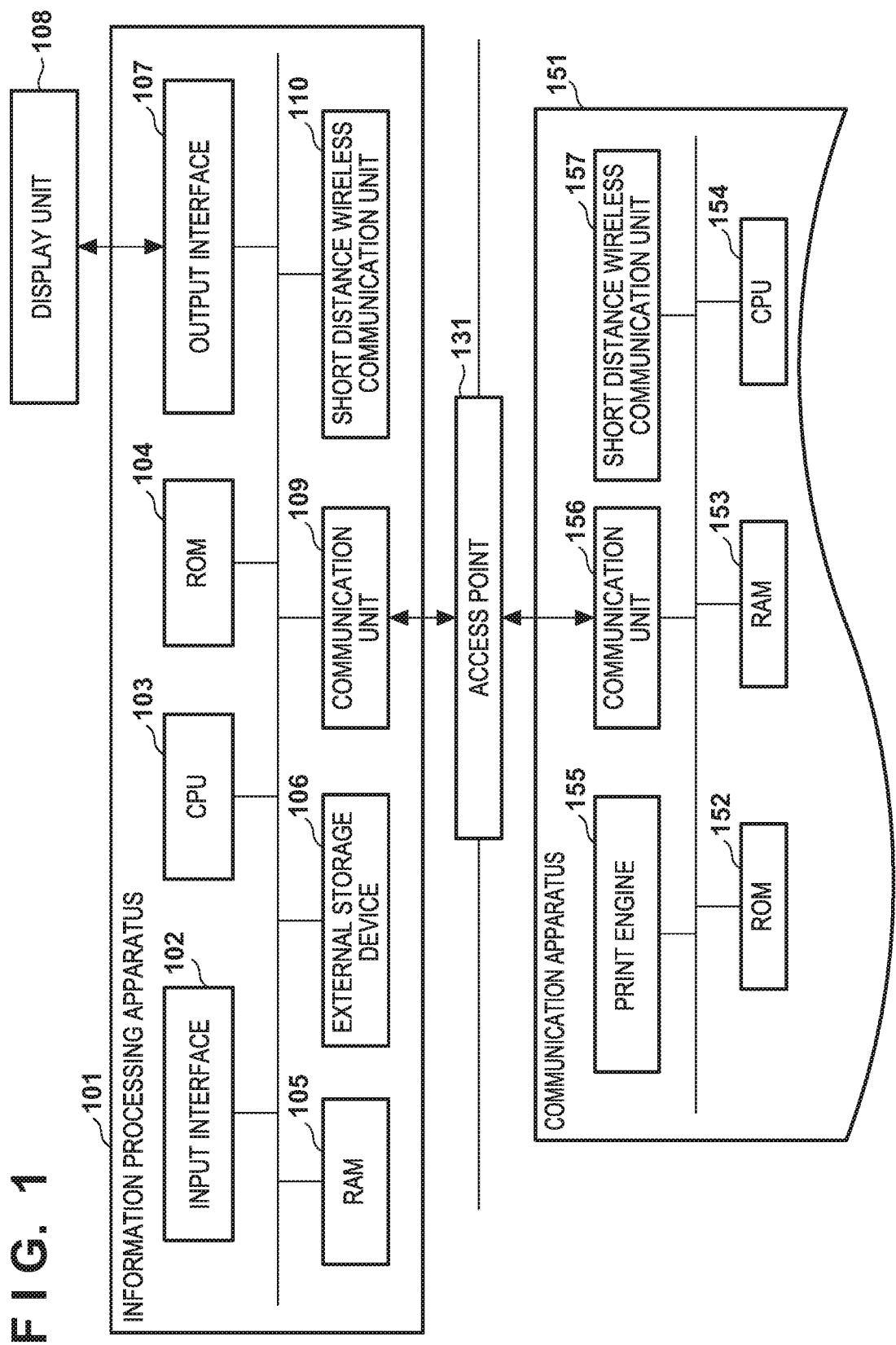
FIG. 1 is a block diagram showing the arrangement of an information processing apparatus and a communication apparatus according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

An information processing apparatus and a communication apparatus, which are included in a communication system (position detection system) according to this embodiment, will be described. In this embodiment, a smartphone will be exemplified as the information processing apparatus. However, the information processing apparatus is not limited to this, and various apparatuses such as a portable terminal, a notebook PC, a tablet terminal, a PDA (Personal Digital Assistant), and a digital camera can be applied. Additionally, in this embodiment, a printer will be exemplified as the communication apparatus. However, the communication apparatus is not limited to this, and various apparatuses capable of wirelessly communicating with the information processing apparatus can be applied. For example, as a printer, the embodiment can be applied to an inkjet printer, a full-color laser beam printer, a monochrome printer, and the like. The embodiment can be applied not only to printers but also to a copying machine, a facsimile apparatus, a portable terminal, a smartphone, a notebook PC, a tablet terminal, a PDA, a digital camera, a music playback device, a TV, and the like. The embodiment can also be applied to a multi-function peripheral having a plurality of functions such as a copy function, a FAX function, and a print function.

The arrangement of an information processing apparatus according to this embodiment and a communication apparatus capable of communicating with the information processing apparatus according to this embodiment will be described first with reference to the block diagram of FIG. 1. In this embodiment, the following arrangement will be described as an example. However, this embodiment can be applied to an apparatus capable of communicating with the communication apparatus, and functions are not particularly limited as shown in FIG. 1.

An information processing apparatus 101 is the information processing apparatus according to this embodiment. The information processing apparatus 101 includes an input interface 102, a CPU 103, a ROM 104, a RAM 105, an external storage device 106, an output interface 107, a display unit 108, a communication unit 109, a short distance wireless communication unit 110, and the like.

The input interface 102 is an interface configured to accept data input or an operation instruction from a user, and is formed by a physical keyboard, buttons, a touch panel, and the like. Note that the output interface 107 to be described later and the input interface 102 may have the same components, and screen output and acceptance of an operation from the user may be done by the same components.

The CPU 103 is a system control unit, and controls the overall information processing apparatus 101.

The ROM 104 stores permanent data such as control programs to be executed by the CPU 103, data tables, an embedded operating system (to be referred to as an OS hereinafter), and programs. In this embodiment, each control program stored in the ROM 104 performs software execution control such as scheduling, task switch, and interrupt processing under the management of the embedded OS stored in the ROM 104.

The RAM 105 is formed by an SRAM (Static Random Access Memory) or the like, which needs a backup power supply. Note that the RAM 105 can store important data such as program control variables without volatilizing them because the data are held by a primary battery (not shown) for data backup. Memory areas configured to store the setting information of the information processing apparatus 101, the management data of the information processing apparatus 101, and the like are also provided in the RAM 105. The RAM 105 is also used as the main memory and the work memory of the CPU 103.

The external storage device 106 stores an application configured to provide a print execution function, a print information generation program configured to generate print information that the communication apparatus 151 can interpret, and the like. The external storage device 106 also stores various kinds of programs such as an information transmission/reception control program configured to transmit/receive information to/from the communication apparatus 151 connected via the communication unit 109, and various kinds of information to be used by these programs.

The output interface 107 is an interface configured to perform control for the display unit 108 to display data or notify the state of the information processing apparatus 101.

The display unit 108 is formed from an LED (Light Emitting Diode) or an LCD (Liquid Crystal Display), and displays data or notifies the state of the information processing apparatus 101. Note that input from the user may be accepted via the display unit 108 by installing, on the display unit 108, a hard keyboard or a soft keyboard including numeric input keys, mode setting keys, a determination key, a cancel key, and a power key.

The communication unit 109 is a component connected to an apparatus such as the communication apparatus 151 to execute data communication. For example, the communication unit 109 can be connected to an access point (not shown) in the communication apparatus 151. When the communication unit 109 and the access point in the communication apparatus 151 are connected, the information processing apparatus 101 and the communication apparatus 151 can communicate with each other. Note that the communication unit 109 may communicate with the communication apparatus 151 directly by wireless communication, via an external access point (access point 131) that exists outside the information processing apparatus 101 or the communication apparatus 151. As the wireless communication method, for example, Wi-Fi (Wireless Fidelity)® that is a communication method complying with the IEEE802.11 series (IEEE802.11a, IEEE802.11n (Wi-Fi 4), IEEE802.11ac (Wi-Fi 5), IEEE802.11ax (Wi-Fi 6), and the like) or Bluetooth® can be used. As the access point 131, for example, a device such as a wireless LAN router can be used. Note that in this embodiment, a method of connecting the information processing apparatus 101 and the communication apparatus 151 directly without an intervention of an external access point will be referred to as a direct connection method. In addition, a method of connecting the information processing apparatus 101 and the communication apparatus 151 via an external access point will be referred to as an infrastructure connection method.

The short distance wireless communication unit 110 is a component to be wirelessly connected to an apparatus such as the communication apparatus 151 in a short distance to execute data communication, and performs communication using a communication method different from that of the communication unit 109. The short distance wireless communication unit 110 can be connected to a short distance wireless communication unit 157 in the communication apparatus 151. Note that in this embodiment, Bluetooth5.1 is used as the communication method of the short distance wireless communication unit 110. In this embodiment, however, the standard is not limited to this, and any standard having a position detection function equal to or more than Bluetooth5.1, like a Bluetooth standard after Bluetooth5.1, can be applied. Note that Bluetooth5.1 includes both the Classic Bluetooth standard and the Bluetooth Low Energy (BLE) standard. In this embodiment, BLE is used as the communication method of the short distance wireless communication unit 110.

The communication apparatus 151 is the communication apparatus according to this embodiment. The communication apparatus 151 includes a ROM 152, a RAM 153, a CPU 154, a print engine 155, a communication unit 156, the short distance wireless communication unit 157, and the like.

As an access point in the communication apparatus 151, the communication unit 156 includes an access point to be connected to an apparatus such as the information processing apparatus 101. Note that by the internal access point, the communication apparatus 151 can operate as a master station (parent station), and the communication unit 109 of the information processing apparatus 101 can be connected. That is, by the internal access point, the communication apparatus 151 and the information processing apparatus 101 can directly be connected. Note that the communication unit 156 may directly communicate with the information processing apparatus 101 by wireless communication, or may communicate via the access point 131. As the communication method, for example, Wi-Fi (Wireless Fidelity)® that is a communication method complying with the IEEE802.11 series (IEEE802.11a, IEEE802.11n (Wi-Fi 4), IEEE802.11ac (Wi-Fi 5), IEEE802.11ax (Wi-Fi 6), and the like) can be used. In direct connection, the communication unit 156 may include hardware that functions as an access point, or may operate as an access point by software that causes the unit to function as an access point. In addition, the communication unit 156 may function as Group Owner that is a master station of Wi-Fi Direct®. Note that as the communication method, Bluetooth® or the like may be used.

The short distance wireless communication unit 157 is a component to be wirelessly connected to an apparatus such as the information processing apparatus 101 in a short distance. In this embodiment, Bluetooth5.1 is used as the communication method of the short distance wireless communication unit 157. More specifically, in this embodiment, BLE is used as the communication method of the short distance wireless communication unit 157.

The RAM 153 is formed by an SRAM or the like, which needs a backup power supply. Note that the RAM 153 can store important data such as program control variables without volatilizing them because the data are held by a primary battery (not shown) for data backup. Memory areas configured to store the setting information of the communication apparatus 151, the management data of the communication apparatus 151, and the like are also provided in the RAM 153. The RAM 153 is also used as the main memory and the work memory of the CPU 154, and stores a reception buffer configured to temporarily store print information received from the information processing apparatus 101 or the like and various kinds of information.

The ROM 152 stores permanent data such as control programs to be executed by the CPU 154, data tables, and an OS program. In this embodiment, each control program stored in the ROM 152 performs software execution control such as scheduling, task switch, and interrupt processing under the management of the embedded OS stored in the ROM 152.

The CPU 154 is a system control unit, and controls the overall communication apparatus 151.

The print engine 155 forms an image on a print medium such as paper using a printing material such as ink based on information stored in the RAM 153 or a print job received from the information processing apparatus 101 or the like, and outputs the print result. At this time, the print job transmitted from the information processing apparatus 101 or the like has a large transmission data amount, and high-speed communication is required. Hence, the print job is received via the communication unit 156 capable of communicating faster than the short distance wireless communication unit 157.

Note that a memory such as an external HDD or an SD card may be attached as an optional device to the communication apparatus 151, and information stored in the communication apparatus 151 may be stored in the memory.

Additionally, for the communication apparatus according to this embodiment, a connection mode is set by connection setting processing, and the communication apparatus communicates with the information processing apparatus by a connection form based on the set connection mode. When the communication apparatus according to this embodiment performs communication by infrastructure connection, an infrastructure connection mode is set as the connection mode. When performing communication by direct connection, a direct connection mode is set as the connection mode.

Here, as an example, processing sharing between the information processing apparatus 101 and the communication apparatus 151 is done as described above. However, the sharing form is not particularly limited to this, and another form is also possible.

In this embodiment, the information processing apparatus 101 stores a predetermined application in the ROM 104, the external storage device 106, or the like. The predetermined application is, for example, an application program configured to transmit a print job to print image data or document data in the information processing apparatus 101 to the communication apparatus 151. An application having such a function will be referred to as a print application hereinafter. Note that the print application may have functions other than the print function. For example, if the communication apparatus 151 has a scan function, the print application may have a function of scanning an original set on the communication apparatus 151, a function of doing other settings for the communication apparatus 151, a function of confirming the state of the communication apparatus 151, and the like. That is, the print application may have a function of transmitting not only a print job but also a scan job or a setting job to the communication apparatus 151. In addition, the predetermined application is not limited to the print application, and may be an application program having a function other than printing.

Figure 2:
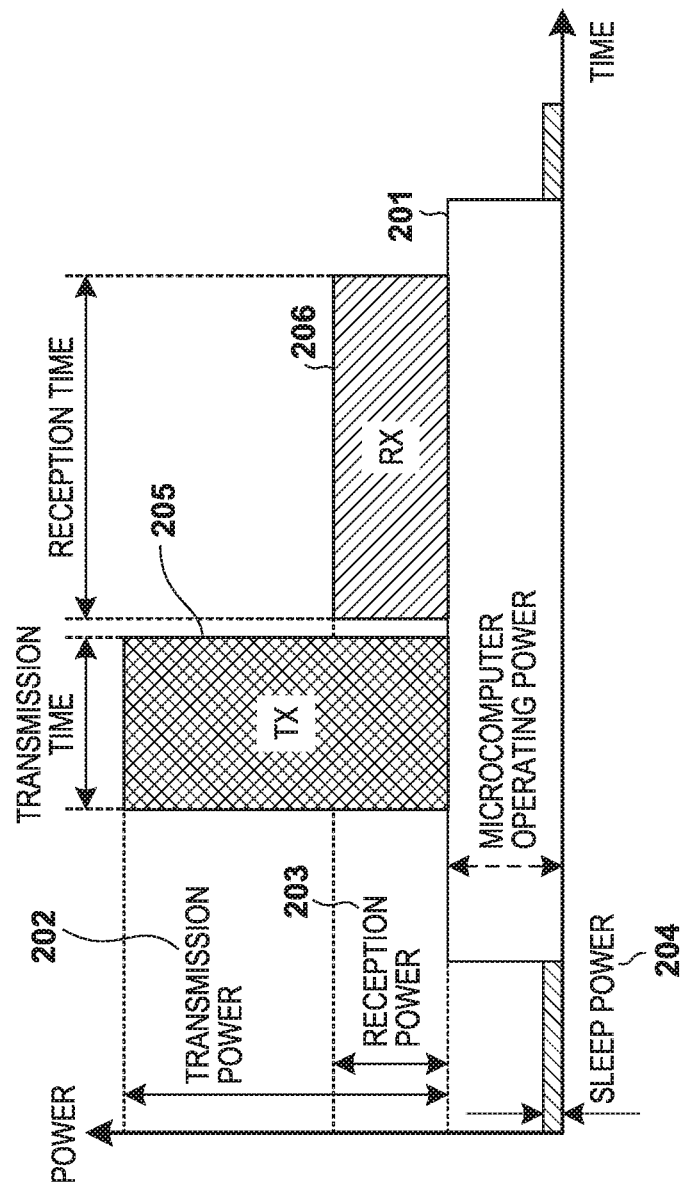
FIG. 2 is a view for explaining processing of broadcast of advertisement information and reception of connection request information according to the embodiment.

In this embodiment, a description will be made assuming that the short distance wireless communication unit 110 and the short distance wireless communication unit 157 communicate by BLE. Note that in this embodiment, the short distance wireless communication unit 157 functions as an advertiser (or slave) that broadcasts advertisement information to be described later, and the short distance wireless communication unit 110 functions as a scanner (or master) that receives the advertisement information. Also, a description will be made assuming that the communication unit 109 and the communication unit 156 communicate by wireless LAN (Wi-Fi). Processing of transmission of advertisement information in the BLE standard and reception of a BLE connection request will be described here. In this embodiment, the short distance wireless communication unit 157 operates as a slave device, as described above. Hence, the short distance wireless communication unit 157 executes the processing. The short distance wireless communication unit 157 performs communication by dividing a frequency band of 2.4 GHz into 40 channels (0ch to 39ch). Of the channels, the short distance wireless communication unit 157 uses the 37th to 39th channels for transmission of advertisement information or reception of a BLE connection request, and uses the 0th to 36th channels for data communication after BLE connection. In FIG. 2, the ordinate represents the power consumption of the short distance wireless communication unit 157, and the abscissa represents time. Power consumption when transmitting advertisement information using one channel is shown for each processing. Tx 205 represents total power consumption in transmission processing that is processing of broadcasting advertisement information, and Rx 206 represents total power consumption in reception processing that is processing of keeping a receiver used to receive a BLE connection request enabled. Transmission power 207 represents instantaneous power consumption by transmission processing. Reception power 203 represents instantaneous power consumption by reception processing. Microcomputer operating power 201 represents instantaneous power consumption in a case in which a microcomputer in the short distance wireless communication unit 157 is operating. Note that the microcomputer operates even before and after the Tx 205 and the Rx 206 because the microcomputer needs to be activated in advance to execute or stop transmission/reception processing. If advertisement information is transmitted by a plurality of channels, the power consumption increases by the number of channels to transmit advertisement information. Additionally, when the microcomputer is not operating, and the short distance wireless communication unit 157 is in a power saving state, sleep power 204 is the instantaneous power consumption of the short distance wireless communication unit 157. In this way, the short distance wireless communication unit 157 performs transmission processing using a predetermined channel, and then performs reception processing for a predetermined time using the same channel, thereby waiting for transmission of a BLE connection request from the information processing apparatus 101.

Figure 3:
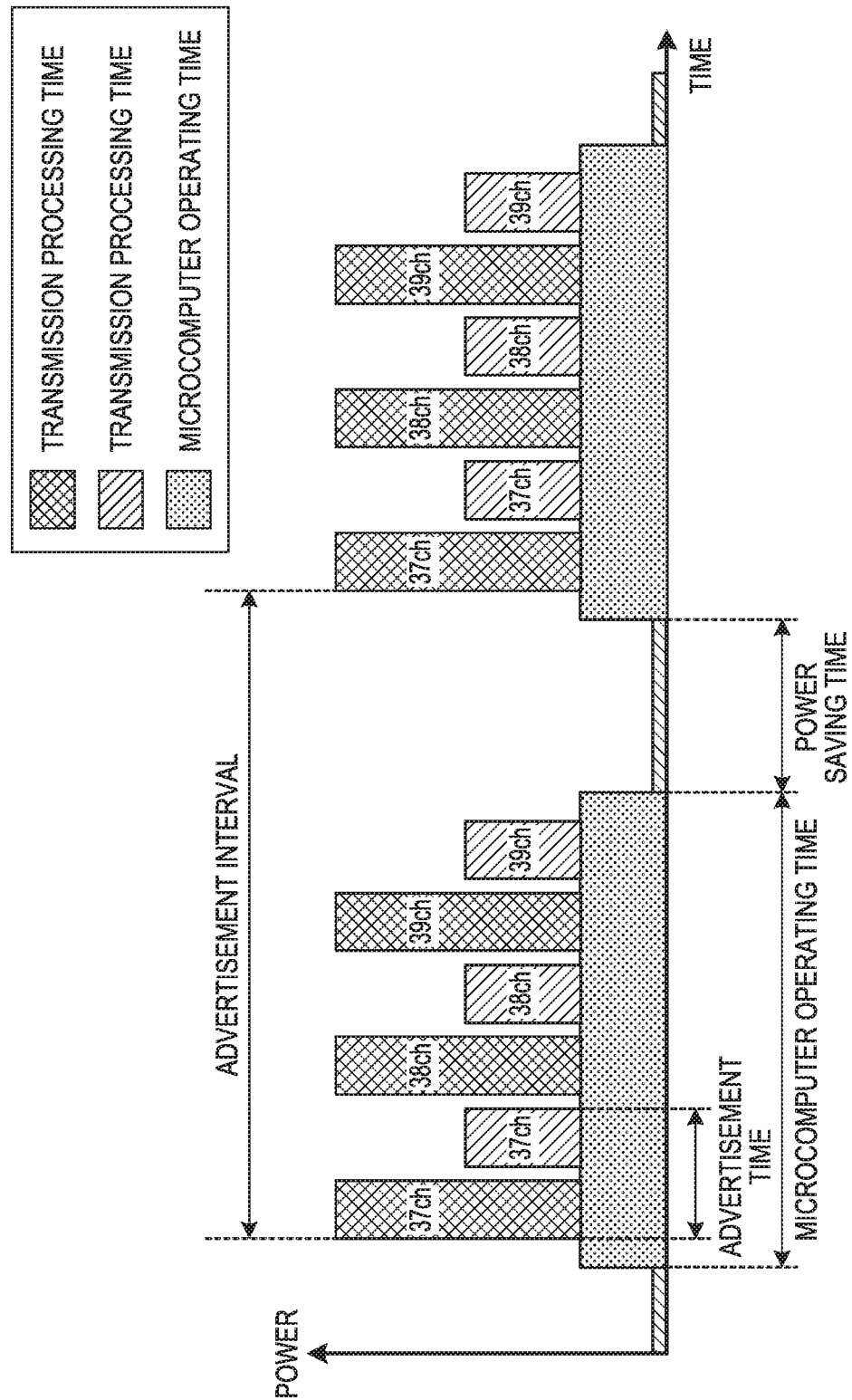
FIG. 3 is a view for explaining advertisement in BLE.

Additionally, as shown in FIG. 3, the short distance wireless communication unit 157 repeats the transmission processing and the reception processing of advertisement information three times on a channel basis, and stops the operation of the microcomputer to be in a power saving state for a predetermined time. A combination of transmission processing and reception processing of advertisement information by a predetermined channel will be referred to as advertisement hereinafter. In addition, a time interval to transmit advertisement information by a predetermined channel will be referred to as an advertisement interval. Note that the number of times of advertisement repeated from the first advertisement to the power saving state can arbitrarily be changed as long as the number of times is three or less. In FIG. 3, as the channels at the time of advertisement, the 37th channel, the 38th channel, and the 39th channel are sequentially used in this order. However, the order can be random. The order may change between the first advertisement, the second advertisement, and the third and subsequent advertisement.

Figure 5:
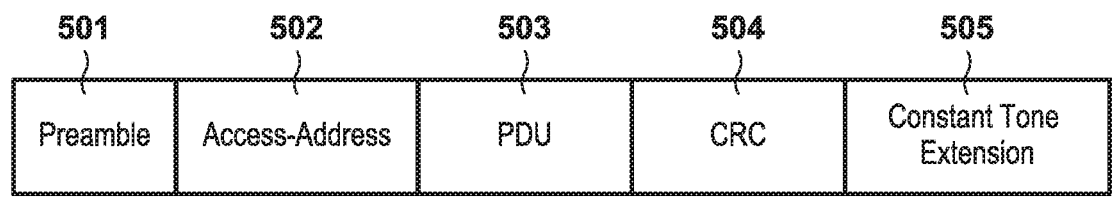
FIG. 5 is a view showing an example of the structure of a link layer packet including advertisement information to be transmitted in BLE.
Figure 9:
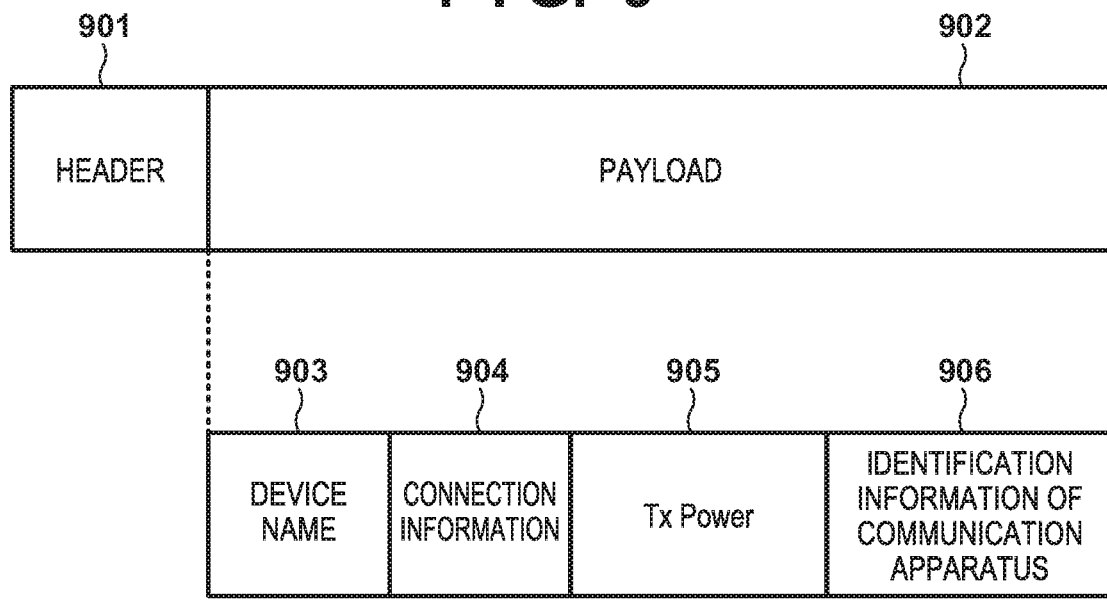
FIG. 9 is a view showing an example of a detailed structure of a PDU including advertisement information to be transmitted in BLE.

FIG. 5 shows an example of the structure of advertisement information transmitted by the short distance wireless communication unit 157 in the communication apparatus 151 to cause the information processing apparatus 101 to detect the distance to the communication apparatus 151 and the direction of the position of the communication apparatus 151. A constant tone extension (CTE) is data used to detect the direction of the communication apparatus 151 with respect to the information processing apparatus 101. A preamble 501 is data for clock synchronization used when the information processing apparatus 101 receives advertisement information of the communication apparatus 151. Access-address 502 is data for frame synchronization used when the information processing apparatus 101 receives advertisement information of the communication apparatus 151. PDU 503 is an actual data portion in advertisement information transmitted by the communication apparatus 151. Note that a header 901 and a payload 902 included in advertisement information shown in FIG. 9 are pieces of information included in the PDU 503. CRC 504 is the error detection code value of the PDU 503 at the time of communication.

FIG. 9 shows an example of the structure of the PDU 503 of advertisement information broadcast by the short distance wireless communication unit 157.

When power supply is started, the short distance wireless communication unit 157 performs initialization processing and transitions to an advertising state. When transitioning to the advertising state, the short distance wireless communication unit 157 periodically broadcasts advertisement information (advertisement signal) to the periphery based on the advertisement interval. The advertisement information is formed from the header 901 and the payload 902. The information processing apparatus 101 receives the advertisement information, thereby recognizing the presence of the communication apparatus 151. Furthermore, the information processing apparatus 101 transmits a BLE connection request to the communication apparatus 151, and can therefore be BLE-connected to the communication apparatus 151. The header 901 is an area where the type of advertisement information, the information of the size of the payload 902, and the like are stored. The payload 902 stores information such as a device name 903 serving as identification information, mounted profile information, connection information 904 used to BLE-connect the communication apparatus 151, and transmission power (Tx Power) 905 of the advertisement information. Note that identification information 906 of the communication apparatus may be included in the advertisement information. The identification information 906 of the communication apparatus corresponds to the MAC address of the communication apparatus, the service information of the communication apparatus, the SSID of the access point in the communication apparatus, a password, or the like.

In this embodiment, when the communication apparatus 151 is powered on, the short distance wireless communication unit 157 transitions to the advertising state and starts transmitting advertisement information. The timing at which the short distance wireless communication unit 157 starts transmitting advertisement information is not limited to the above-described form. For example, a timing at which a predetermined operation for enabling the BLE function is also possible.

Note that a form may be possible in which the short distance wireless communication unit 157 transmits first advertisement information, and upon receiving a scan request to the first advertisement information from the information processing apparatus 101, transmits, as a scan response, second advertisement information including contents different from those of the first advertisement information. The information processing apparatus 101 that has received the second advertisement information transmits a connection request to the communication apparatus 151. Note that, for example, the first advertisement information includes information concerning the transmission power of advertisement information, the identification information of the short distance wireless communication unit 157, and the like. The second advertisement information includes the identification information of the communication apparatus 151, and information concerning the functions and hardware of the communication apparatus 151, and the like. In such a form, for example, the print application is designed as an application configured to handle second advertisement information. Hence, in the following explanation, the advertisement information handled by the print application is assumed to be the second advertisement information.

Figure 6:
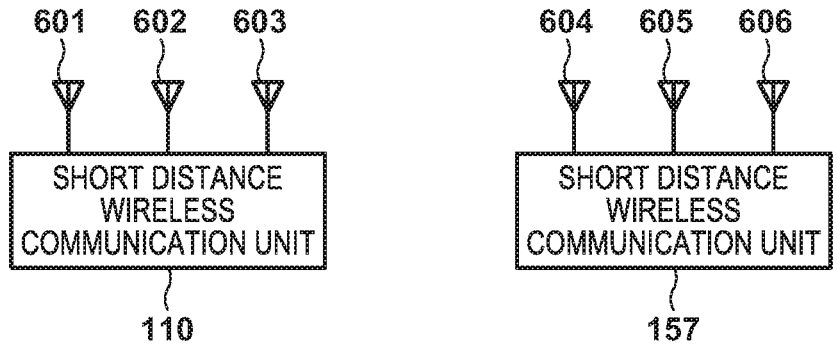
FIG. 6 is a view showing the arrangement of a short distance wireless communication unit when performing direction detection in BLE.

FIG. 6 is a block diagram for explaining the function of the information processing apparatus 101 to detect the direction of the communication apparatus 151 using the advertisement information transmitted by the short distance wireless communication unit 157 in the communication apparatus 151. The short distance wireless communication unit 110 in the information processing apparatus 101 includes an antenna 601, an antenna 602, and an antenna 603, and the short distance wireless communication unit 157 in the communication apparatus 151 includes an antenna 604, an antenna 605, and an antenna 606. Note that the number of antennas included in each of the short distance wireless communication unit 110 and the short distance wireless communication unit 157 is not limited to this. The number of antennas may be one or two, or four or more. In addition, the number of antennas may be different between the short distance wireless communication unit 110 and the short distance wireless communication unit 157. FIG. 6 shows the antennas included in the short distance wireless communication unit 110 and the short distance wireless communication unit 157 as if they were arranged on a line. However, the arrangement of the antennas is not limited to this.

The methods of the information processing apparatus 101 to estimate the direction of the communication apparatus 151 using Bluetooth5.1 are classified into (1) a method implemented when the short distance wireless communication unit 110 (receiving side) includes a plurality of antennas, and (2) a method implemented when the short distance wireless communication unit 157 includes a plurality of antennas.

The method (1) of these methods will be described with reference to FIG. 7. In the arrangement shown in FIG. 7, using the plurality of antennas of the short distance wireless communication unit 110 that is the receiving-side apparatus, the short distance wireless communication unit 110 estimates the angle of arrival of a received electromagnetic wave based on the phase difference (propagation delay difference) between electromagnetic waves when arrived at the antennas. The angle of arrival will sometimes be referred to as an AoA hereinafter.

Figure 7:
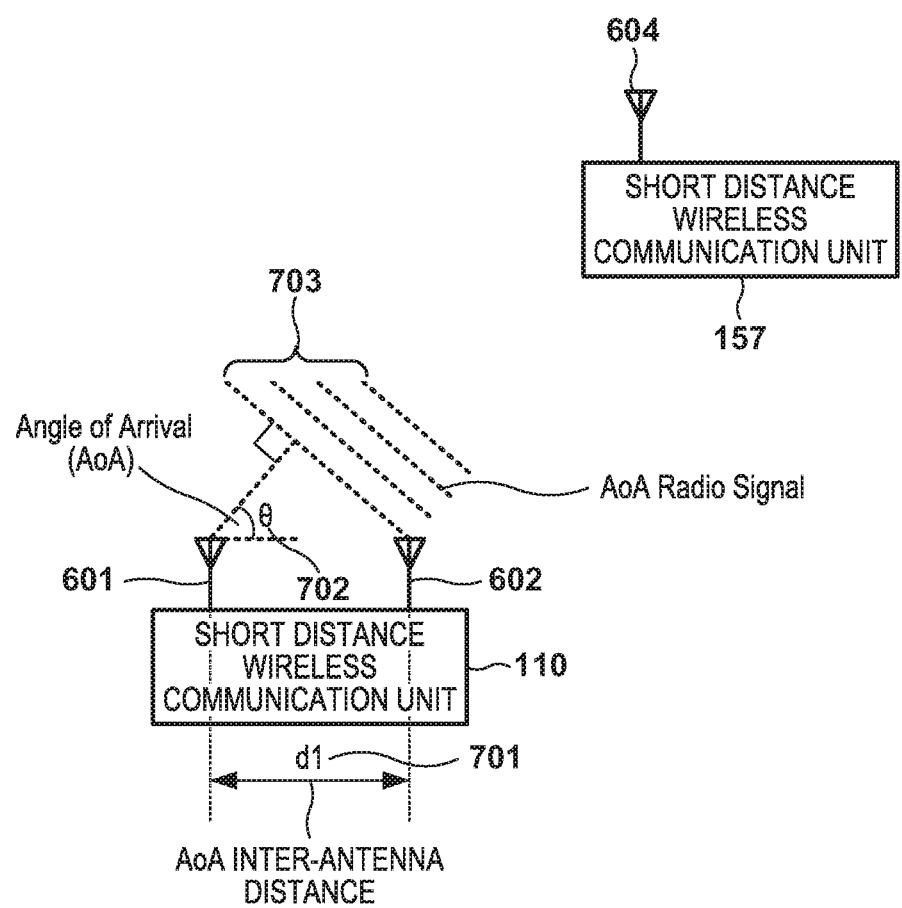
FIG. 7 is a view showing an arrangement including a plurality of antennas on an advertisement receiving side when performing direction detection in BLE.

In FIG. 7, the short distance wireless communication unit 157 transmits advertisement information by a radio frame (AoA Radio Signal 703) including a CTE 505 using the antenna 604. The short distance wireless communication unit 110 receives the radio frame by the plurality of antennas (both the antenna 601 and the antenna 602). At this time, an inter-antenna distance 701 between the antenna 601 and the antenna 602 is d1, and an AoA 702 is θ. In this case, the electromagnetic wave to be received by the antenna 601 is received in a distance longer by d1×cos(θ) than the electromagnetic wave received by the antenna 602. For this reason, letting λ be the wavelength of the electromagnetic wave, the phase of the electromagnetic wave received by the antenna 601 delays, as compared to the phase of the electromagnetic wave received by the antenna 602, by a difference Ψ1 between the phase of the electromagnetic wave received by the antenna 602 and the phase of the electromagnetic wave received by the antenna 601

$$\Psi 1 = 2\pi \times (d1 \times \cos(\theta)/\lambda) \quad (1)$$

From equation (1), the AoA 702 can be calculated by $$\theta = \arccos((\Psi 1 \times \lambda)/(2\pi \times d1)) \quad (2)$$

Hence, by calculating equation (2), the information processing apparatus 101 can estimate the direction of the communication apparatus 151 (that is, the angle between the information processing apparatus 101 and the communication apparatus 151).

Figure 8:
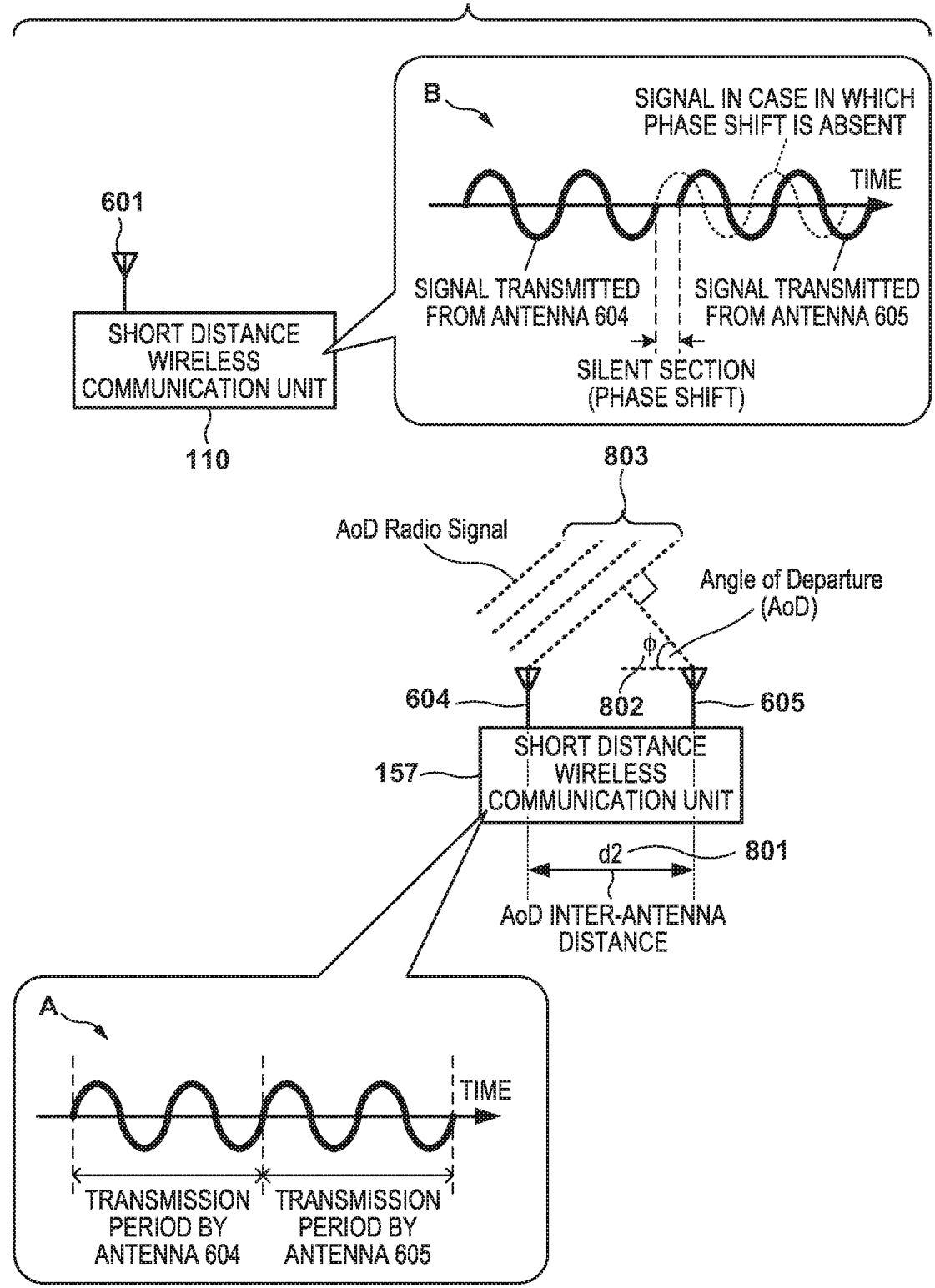
FIG. 8 is a view showing an arrangement including a plurality of antennas on an advertisement transmitting side when performing direction detection in BLE.

The method (2) of the above-described methods will be described next with reference to FIG. 8. In the arrangement shown in FIG. 8, advertisement information is transmitted from the plurality of antennas of the short distance wireless communication unit 157 that is the transmitting-side apparatus by a radio frame (AoD Radio Signal (AoD signal) 803) including the CTE 505 in different periods. For example, as shown in (A) of FIG. 8, the transmission period of the AoD signal 803 by the antenna 604 is set, and immediately after that, the transmission period of the AoD signal 803 by the antenna 605 is set. In this case, in the short distance wireless communication unit 157, no silent section is generated between the transmission of the AoD signal 803 by the antenna 604 and the transmission of the AoD signal 803 by the antenna 605. On the other hand, the short distance wireless communication unit 110 can receive these radio signals in a form as shown in (B) of FIG. 8. That is, since the signal transmitted from the antenna 605 arrives at the short distance wireless communication unit 110 with a delay via a path longer than that of the signal transmitted from the antenna 604, a silent section is generated between the signals. In addition, if the antenna 605 transmits the signal first, the signal transmitted from the antenna 604 arrives at the short distance wireless communication unit 110 before signal transmitted from the antenna 605 wholly arrives at the short distance wireless communication unit 110. If a silent section of a predetermined length is set after completion of the signal transmission period of the antenna 604, and the signal transmission period from the antenna 605 is then set, the silent section is observed longer than the predetermined length in the radio signal received by the short distance wireless communication unit 110. Similarly, if a silent section of a predetermined length is set after completion of the signal transmission period of the antenna 605, and the signal transmission period from the antenna 604 is then set, the silent section is observed shorter than the predetermined length in the radio signal received by the short distance wireless communication unit 110. In this way, the signals transmitted from the plurality of antennas are observed as the shift of timing according to the path lengths in the short distance wireless communication unit 110. Note that to observe the shift of timing, the short distance wireless communication unit 110 is notified, in advance, of scheduling information representing which antenna transmits a signal at which timing (by, for example, the short distance wireless communication unit 157 or another apparatus).

Note that the shift of reception timing corresponds to the shift of the phase of the received signal. For example, in the example shown in FIG. 8, the signal transmitted from the antenna 605 arrives at the short distance wireless communication unit 110 in a path longer by d2×cos(φ) than the signal transmitted from the antenna 604. Here, d2 is an inter-antenna distance 801 between the antenna 604 and the antenna 605. Because of the path length difference, letting c be the propagation speed of light, a reception timing shift of d2×cos(φ) sec occurs. Simultaneously, a phase difference represented by $$\Psi 2 = 2\pi \times d2 \times \cos(\varphi)/2. \quad (3)$$

is generated. Note that λ is the wavelength of the electromagnetic wave, as described above. In addition, φ is the angle made by a straight line that connects the short distance wireless communication unit 157 and the short distance wireless communication unit 110 and a straight line that connects the antenna 604 and the antenna 605. Note that the angle is called an angle of departure, and will be referred to as an AoD 802 hereinafter. The short distance wireless communication unit 110 can identify the phase difference $\Psi 2$ by performing correlation detection using, as a reference, for example, the signal received first in a plurality of signals transmitted from the short distance wireless communication unit 157. From equation (3), the short distance wireless communication unit 110 can calculate, using the phase difference $\Psi 2$, the AoD 802 as $$\varphi = \arccos((\Psi 2 \times \lambda)/(2\pi \times d2)) \quad (4)$$

Note that the short distance wireless communication unit 110 acquires the information of the inter-antenna distance d2 in advance from the short distance wireless communication unit 157 or another apparatus. The short distance wireless communication unit 110 calculates the AoD 802 as indicated by equation (4), thereby identifying the direction of the short distance wireless communication unit 110 viewed from the short distance wireless communication unit 157 (that is, the angle between the information processing apparatus 101 and the communication apparatus 151). In addition, the short distance wireless communication unit 110 can estimate the direction of arrival of the electromagnetic wave based on the AoD 802 by knowing how the antenna 604 and the antenna 605 are arranged. That is, if the antenna 604 is arranged on the west side of the antenna 605, and the AoD 802 is estimated as 45°, the short distance wireless communication unit 110 can estimate that the electromagnetic wave has arrived from the south east direction.

Furthermore, the short distance wireless communication unit 110 can estimate the distance from the short distance wireless communication unit 157 based on the reception strength of the electromagnetic wave and the transmission power value (the Tx Power 905 shown in FIG. 9) of the electromagnetic wave. More specifically, a propagation loss can be obtained based on the value of the Tx Power and the electromagnetic wave strength of the received advertisement information, and the distance from the BLE advertiser device can be estimated. Hence, based on the information of the angle and the information of the distance estimated based on the AoA or AoD, the positional relationship with the short distance wireless communication unit 157 can be recognized. Additionally, the short distance wireless communication unit 110 acquires the information of the position where the short distance wireless communication unit 157 is arranged, thereby accurately estimating the position of the self-apparatus.

Note that in the explanation of the method implemented when the short distance wireless communication unit 110 includes a plurality of antennas, a form in which two antennas, that is, the antenna 601 and the antenna 602 are used as the plurality of antennas has been described. However, the number of antennas used is not limited to this. For example, the information processing apparatus 101 may use three or more antennas and calculate the average of angles of arrival θ obtained from the antennas, thereby acquiring the angle of arrival θ 702. Similarly, in the method implemented when the short distance wireless communication unit 157 includes a plurality of antennas as well, the number of antennas used as the plurality of antennas is not limited to that described above. For example, the communication apparatus 151 may use three or more antennas and calculate the average of angles of arrival θ obtained from the antennas, thereby acquiring the angle of departure φ 802.

An embodiment in which one of the information processing apparatus 101 and the communication apparatus 151 uses a plurality of antennas has been described above. However, the present invention is not limited to this. Both apparatuses may use a plurality of antennas.

A form in which the information processing apparatus 101 detects the direction of one communication apparatus 151 based on the reception result of the AoD has been described above. However, the present invention is not limited to this. The information processing apparatus 101 may detect the directions of two or more communication apparatuses 151. Additionally, by detecting the directions of two or more communication apparatuses 151 and referring to detection data, the information processing apparatus 101 can detect the distance between the apparatuses and the directions and positions of the apparatuses accurately as compared to a form in which the direction of one communication apparatus 151 is detected. The outline of GATT (Generic Attribute Profile) communication in the BLE standard will be described here. GATT is a profile that controls read/write (transmission/reception) of information in the BLE standard.

In GATT communication, two roles of a GATT client and a GATT server are defined based on the transfer source and transfer destination of data.

The GATT client transmits a request to the GATT server, and receives a response from the GATT server. In this embodiment, the information processing apparatus 101 serves as the GATT client. The GATT client can execute read of information held in a storage area in the short distance wireless communication unit of the GATT client and write of information to the storage area.

Upon receiving the request from the GATT client, the GATT server returns a response to the GATT client. In this embodiment, the communication apparatus 151 serves as the GATT server, and the information processing apparatus 101 serves as the GATT client. Note that the GATT server operates as a device that stores information such as the state information of the GATT server.

The data format of GATT will be described next. GATT data has a hierarchical structure as shown in FIG. 11, which is formed from three elements called a service, a characteristic, and a descriptor. The descriptor may not exist. In this embodiment, no descriptor exists in GATT data formed by the short distance wireless communication unit 157. Each of the service, the characteristic, and the descriptor can be identified by a UUID (Universally Unique Identifier) expressed by 32 digits. The UUID here is used as an identifier configured to uniquely identify an object on software. The UUID is a 128-bit numerical value and is normally expressed in hexadecimal as, for example, "550e8400-e29b-41d4-a716-446655440000". Note that some services, characteristics, and descriptors are defined by the standard of Bluetooth SIG or are unique to a vendor. The UUID of an element unique to a vendor is expressed by 32 digits, as described above. The UUID of an element defined by the standard of Bluetooth SIG is expressed by four digits. That is, for example, the UUID of an element defined by the standard of Bluetooth SIG is expressed as 2A49.

A service puts attributes in GATT data into groups based on a common part, and each service includes one or more characteristics. As for a characteristic, a single value is set for each characteristic. For a descriptor, an attribute value used when additional information is necessary for a characteristic is set. A read/write attribute that is a set value representing whether to allow the GATT client to do read or write can be set for each of the service, the characteristic, and the descriptor.

The GATT client designates the UUID of each of the service and the characteristic, thereby executing read/write for the value set in the designated characteristic. Whether read/write can be executed is based on the read/write attribute set for each of the service and the characteristic.

FIG. 12 shows an example of GATT data constructed by the short distance wireless communication unit 157. In the GATT data shown in FIG. 12, "Service UUID" represents a UUID assigned to each service. "Service name" is the name of each service. "Characteristic UUID" represents a UUID assigned to each characteristic. "Characteristic name" is the name of each characteristic. "Service read enable" represents whether the information processing apparatus 101 can read a value concerning each service. "Service write enable" represents whether the information processing apparatus 101 can write a value concerning each service. "Characteristic read enable" represents whether the information processing apparatus 101 can read a value concerning each characteristic. "Characteristic write enable" represents whether the information processing apparatus 101 can write a value concerning each characteristic. "Characteristic indicatable" represents whether it is possible to indicate (notify) the information processing apparatus 101 of a value concerning each characteristic when the communication apparatus 151 has updated it. "Pairing need" represents whether or not to allow the information processing apparatus 101 to write or read a value concerning each characteristic if pairing is not performed yet. If "service read enable" represents read enable (○), and "characteristic read enable" represents read enable (○), the information processing apparatus 101 can read a value concerning a corresponding characteristic. If "service read enable" represents read enable (○), and "characteristic read enable" represents read disable (blank), the information processing apparatus 101 cannot read a value concerning a corresponding characteristic. "Value" represents a value set in each characteristic. If "pairing need" represents that pairing is not needed (blank), the information processing apparatus 101 can read/write a value concerning a corresponding characteristic even in a state in which the information processing apparatus 101 is not paired with the communication apparatus 151. On the other hand, if "pairing need" represents that pairing is needed (○), the information processing apparatus 101 cannot read/write a value concerning a corresponding characteristic unless the information processing apparatus 101 is in a state in which it is paired with the communication apparatus 151.

In this embodiment, authentication is performed between the information processing apparatus 101 and the communication apparatus 151, and pairing processing for executing data read/write by GATT communication between the apparatus is performed. In a state in which pairing between the information processing apparatus 101 and the communication apparatus 151 is not executed, the communication apparatus 151 does not permit information read/write by GATT communication. This can suppress communication between the information processing apparatus 101 and the communication apparatus 151, which are not paired, and, for example, unintended acquisition of information held in the communication apparatus 151 by the information processing apparatus 101 that is not paired. Note that in this embodiment, there are GATT communication that is permitted in a state in which pairing is not performed and GATT communication that is not permitted in a state in which pairing is not performed. Convenience of communication can be improved by enabling communication of information of low confidentiality by GATT communication that is permitted in a state in which pairing is not performed. On the other hand, security of communication can be improved by enabling communication of information of high confidentiality by GATT communication that is not permitted in a state in which pairing is not performed.

Details of pairing processing will be described. If the above-described print application is activated, and a pairing processing execution instruction is accepted from the user via the print application, the information processing apparatus 101 starts searching for advertisement information including specific device information. Note that the specific device information is, for example, the UUID or MAC address of an apparatus (printer or the like) corresponding to the print application. Upon receiving advertisement information including specific device information, the information processing apparatus 101 displays, on the display unit, a list of the apparatuses of the transmission sources of the advertisement information including the specific device information, and accepts selection of a pairing target apparatus from the user. A description will be made here assuming that the communication apparatus 151 is selected.

Figure 4A:
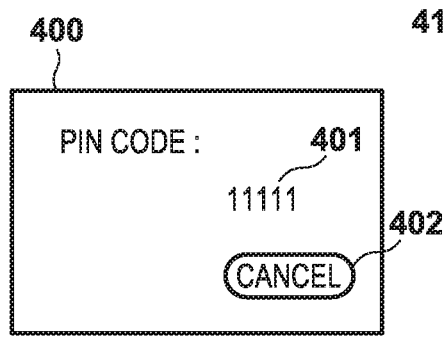
FIGS. 4A and 4B are views showing screens concerning pairing processing.
Figure 4B:
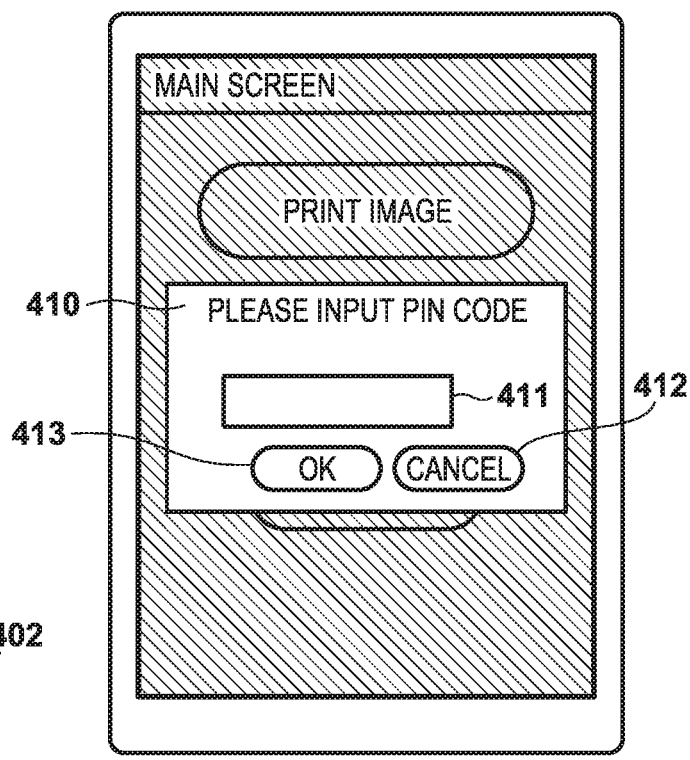

If the selection of the apparatus of the pairing target is accepted, the information processing apparatus 101 transmits a pairing request to the communication apparatus 151 by communication using a security manager protocol. Note that the communication between the apparatuses is performed by the security manager protocol until the pairing ends. Upon receiving the pairing request, the communication apparatus 151 displays, on a display unit 160, a PIN code display screen 400 as shown in FIG. 4A. A PIN code 401 and a cancel button 402 used to cancel pairing processing are displayed on the PIN code display screen 400. When transmitting the pairing request, the information processing apparatus 101 displays, on the display unit 108, a PIN code input screen 410 as shown in FIG. 4B. A PIN code input region 411 used to accept input of the PIN code 401 by the user, an OK button 413 used to transmit the into PIN code 401 to the communication apparatus 151, and a cancel button 412 used to cancel pairing processing are displayed on the PIN code input screen 410. If the OK button 413 is pressed in a state in which the PIN code 401 is input to the PIN code input region 411, the information processing apparatus 101 transmits information including the input PIN code 401 to the communication apparatus 151. The communication apparatus 151 determines whether the PIN code 401 included in the received information matches the PIN code 401 displayed on the PIN code display screen 400, and upon determining that the PIN code matches the PIN code 401 displayed on the PIN code display screen 400, permits the information processing apparatus 101 to do pairing. More specifically, the communication apparatus 151 exchanges link keys (authentication information) created based on the PIN code 401 by a predetermined method with the information processing apparatus 101 using the SMP (Security Manager Protocol) of the BLE standard. The exchanged link keys are stored in the storage area (ROM 104 or the like) of the information processing apparatus 101 and the storage area (ROM 152 or the like) of the communication apparatus 151. Pairing is thus completed, and execution of BLE communication between the apparatus is permitted from then on. Note that when pairing is completed, the information processing apparatus 101 makes the PIN code display screen 400 undisplayed, and displays the original screen again.

After completion of pairing, when transmitting a GATT communication request to the communication apparatus 151, the information processing apparatus 101 notifies the communication apparatus 151 of the link key stored in the storage area at the time of pairing processing. Upon receiving the GATT communication request, the communication apparatus 151 compares the link key stored in the storage area at the time of pairing processing with the notified link key, and confirms whether the apparatus that has transmitted the GATT communication request is a paired apparatus. Upon confirming that the apparatus is a paired apparatus, the communication apparatus 151 starts information read/write by GATT communication with the information processing apparatus 101. Hence, once the pairing processing with the communication apparatus 151 is completed, the information processing apparatus 101 can execute GATT communication with the communication apparatus 151 without input of the PIN code by the user. Note that a form in which the user is caused to input the PIN code 401 displayed on the PIN code input screen 410 to the PIN code input region 411 has been described above. However, the present invention is not limited to this form. For example, a form in which fixed information (the user cannot arbitrarily change) is used as the PIN code 401, and the PIN code is stored in the information processing apparatus 101 simultaneously with installation of the print application may be employed to implement a form in which the communication apparatus 151 is notified of the PIN code 401 without input by the user. In addition, the timing of starting pairing processing is not limited to the above-described form. For example, a timing at which the user has instructed printing via the print application or a timing before BLE connection is performed in connection setting processing is also possible.

The PIN code input screen 210 the information processing apparatus 101 displays may not be displayed depending on the print application. For example, the information processing apparatus 101 may have an application for setting (to be referred to as a setting application hereinafter). The setting application is an application program configured to do settings concerning functions to be executed by the OS. The setting application is an application program that is installed together in a series of processes of installing, for example, the OS in the information processing apparatus 101 or installed in the information processing apparatus 101 in advance together with the OS at the time of delivery of the information processing apparatus 101. When performing pairing with the communication apparatus 151, the information processing apparatus 101 may activate the setting application to make the print application transition to background, and accept, from the user, input for pairing to the Bluetooth setting screen displayed by the setting application.

A PIN code input type pairing method has been described above. However, the pairing method is not limited to the above-described method. A pairing method other than the PIN code input type will be described below. The information processing apparatus 101 acquires information called a key seed, which is information held by the communication apparatus 151, from the communication apparatus 151 via BLE connection. The information processing apparatus 101 and the communication apparatus 151 generate link keys from the key seed in accordance with a rule recognized by them in advance. The generated link keys are stored in the storage area (ROM 104 or the like) of the information processing apparatus 101 and the storage area (ROM 152 or the like) of the communication apparatus 151. That is, the information processing apparatus 101 and the communication apparatus 151 hold identical link keys. When a link key is generated in this way, and GATT communication using the link key is enabled, authentication between the communication apparatus 151 and the information processing apparatus 101 is performed, and pairing processing is completed. After completion of pairing processing, information encrypted based on the link key is communicated by communication between the information processing apparatus 101 and the communication apparatus 151. Upon receiving information encrypted based on the link key, the information processing apparatus 101 or the communication apparatus 151 cancels encryption using the link key held by itself, thereby recognizing the information before encrypted.

Figure 13:
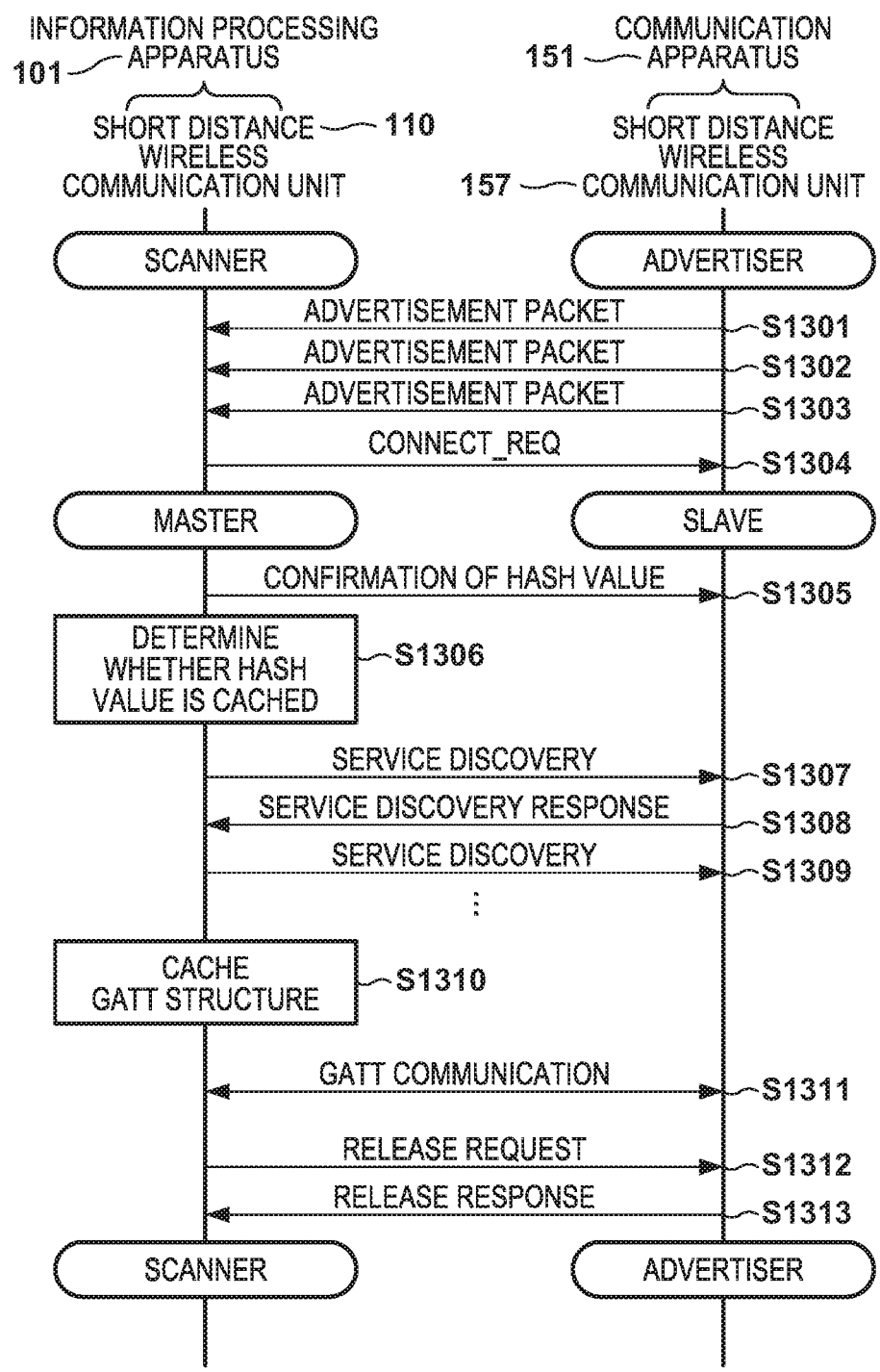
FIG. 13 is a sequence chart showing processing of connecting the information processing apparatus and the communication apparatus by a BLE communication method.

FIG. 13 is a sequence chart for explaining BLE communication between the information processing apparatus 101 and the communication apparatus 151. Note that processing of the communication apparatus 151 shown in this processing sequence is implemented when the CPU 154 loads a control program stored in the ROM 152 or an HDD (not shown) provided in the communication apparatus 151 into the RAM 153 and executes the control program. Additionally, processing of the information processing apparatus 101 shown in this processing sequence is implemented when the CPU 103 loads a control program stored in the ROM 104 or an HDD (not shown) provided in the information processing apparatus 101 into the RAM 105 and executes the control program.

In the following description, the communication apparatus 151 is assumed to be an advertiser that transmits advertisement information at a predetermined interval. The information processing apparatus 101 is assumed to be a scanner that waits for advertisement information transmitted from an advertiser on the periphery. First, the short distance wireless communication unit 157 in the communication apparatus 151 transmits advertisement information (steps S1301 to S1303). The information processing apparatus 101 can recognize the existence of the communication apparatus 151 when the short distance wireless communication unit 110 receives the advertisement information transmitted from the short distance wireless communication unit 157.

When recognizing the communication apparatus 151 and deciding to connect the communication apparatus 151, the information processing apparatus 101 transmits connection request information to the communication apparatus 151. More specifically, the short distance wireless communication unit 110 transmits CONNECT_REQ that is a request to transition to a connection event for establishing network connection by BLE (step S1304). When the short distance wireless communication unit 157 receives CONNECT_REQ, the information processing apparatus 101 and the communication apparatus 151 prepare for transition to the connection event. More specifically, the short distance wireless communication unit 110 and the short distance wireless communication unit 157 notify the CPU 103 and the CPU 154, respectively, that the connection processing for GATT communication is completed.

After that, the information processing apparatus 101 and the communication apparatus 151 transition from the scanner and the advertiser to a master and a slave, respectively, and the information processing apparatus 101 that is the master and the communication apparatus 151 that is the slave establish connection (BLE connection) for GATT communication. Note that in the BLE standard, a master can form a "one-to-multiple" star topology with slaves. When BLE connection is established, the information processing apparatus 101 and the communication apparatus 151 can perform data communication by the GATT communication method from then on.

Before accessing GATT data of the communication apparatus 151 by GATT communication, the information processing apparatus 101 needs to acquire the structure of GATT data held by the communication apparatus 151. The structure of the GATT data includes, for example, the number of services in GATT data, the number of characteristics, the values of UUIDs, an attribute representing a read enable/disable state, and the like. A procedure of the information processing apparatus 101 to acquire the structure of the GATT data is called discovery.

Hence, after BLE connection is established in step S1304, the information processing apparatus 101 starts discovery in step S1305. More specifically, the information processing apparatus 101 transmits, to the communication apparatus 151, a discovery request to request information representing the structure of the GATT data of the communication apparatus 151. As a response to the discovery request, the communication apparatus 151 transmits the information representing the structure of the GATT data to the information processing apparatus 101. The information processing apparatus 101 that has received the information representing the structure of the GATT data identifies an area where a hash value is stored in the GATT data of the communication apparatus 151, and reads the hash value. Note that the hash value is a value stored in a database hash characteristic whose characteristic UUID is 0x2B2A in FIG. 12. The communication apparatus 151 stores, as the value of the database hash characteristic, a hash value calculated by the communication apparatus 151 in advance from the structure of the GATT data. That is, the hash value is a value uniquely determined in accordance with the structure of the GATT data of the communication apparatus 151.

Note that the information processing apparatus 101 stores a hash value read from a terminal to which the information processing apparatus 101 has been connected by BLE in the past in the memory (ROM 104 or the like) provided in the information processing apparatus 101. In step S1306, the information processing apparatus 101 makes comparison to determine whether the hash value read in step S1305 matches a hash value read in the past (a hash value stored in the memory provided in the information processing apparatus 101). That is, the information processing apparatus 101 determines whether the communication apparatus 151 is a terminal to which the information processing apparatus 101 has been connected by BLE in the past. At this time, the information processing apparatus 101 may add not only the hash value but also another information such as individual identification information such as the MAC address of the communication apparatus 151 to the determination conditions.

If NO in step S1306, the information processing apparatus 101 continues discovery to grasp the rest of the structure of the GATT data of the communication apparatus 151. To do this, in step S1307, the information processing apparatus 101 transmits, to the communication apparatus 151, a discovery request to request information representing the structure of the GATT data of the communication apparatus 151. In step S1308, the communication apparatus 151 that has received the request transmits the information representing the structure of the GATT data to the information processing apparatus 101. Note that transmission/reception of the discovery request and transmission/reception of the information representing the structure of the GATT data are repeated as many times as the number of services, characteristics, and descriptors in the GATT data. Hence, in step S1309, transmission/reception of the discovery request and transmission/reception of the information representing the structure of the GATT data are repeated until transmission of all pieces of information representing the structure of the GATT data is completed.

When transmission of all pieces of information representing the structure of the GATT data is completed, in step S1310, the information processing apparatus 101 stores the structure of the GATT data of the communication apparatus 151 as a cache in the memory provided in the information processing apparatus 101. At this time, the information processing apparatus 101 stores the cache of the structure of the GATT data of the communication apparatus 151 and the hash value obtained from the communication apparatus 151 in the memory in association with each other. Note that the information processing apparatus 101 may further store another information such as individual identification information such as the MAC address of the communication apparatus 151 in the memory in association. Note that if YES in step S1306, since the information processing apparatus 101 has already cashed the structure of the GATT data of the communication apparatus 151, the process of steps S1307 to S1310 may be omitted.

By acquiring the structure of the GATT data of the communication apparatus 151, the information processing apparatus 101 can execute arbitrary GATT communication with the communication apparatus 151 from then on. Hence, in step S1311, the information processing apparatus 101 executes arbitrary GATT communication with the communication apparatus 151.

After the GATT communication is completed, in step S1312, the information processing apparatus 101 transmits a release request. The communication apparatus 151 that has received the release request transmits a release response in step S1313, and ends the BLE connection between the apparatuses. When the BLE connection between the apparatuses has ended, the information processing apparatus 101 and the communication apparatus 151 return to the scanner and the advertiser, respectively, and the communication apparatus 151 resumes transmission of advertisement information.

Figure 10:
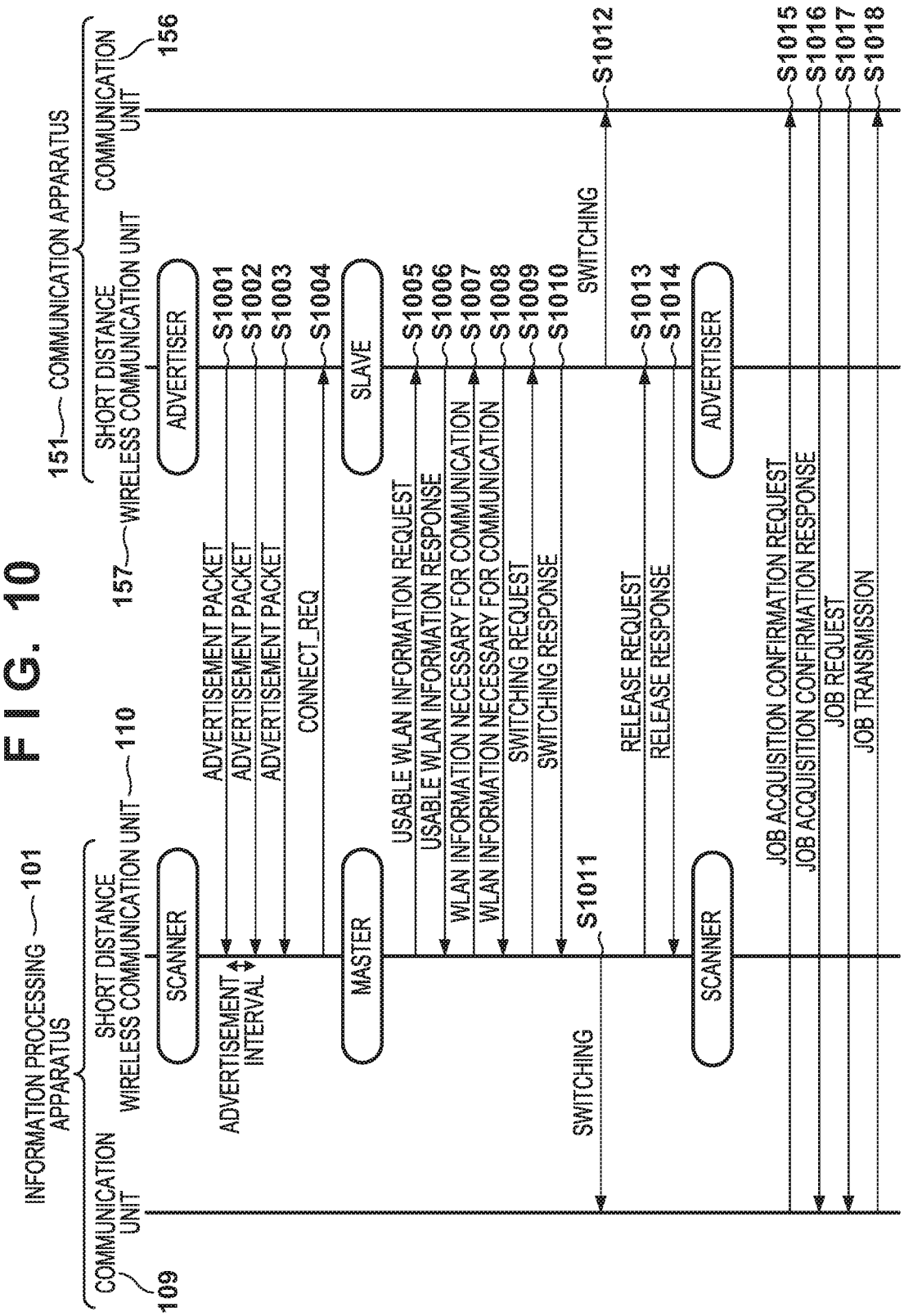
FIG. 10 is a sequence chart showing processing performed when the information processing apparatus and the communication apparatus perform network connection by a BLE communication method.

FIG. 10 is a sequence chart in a case in which the information processing apparatus 101 and the communication apparatus 151 perform network connection by the BLE communication method. A description will be made here by exemplifying a case in which transmission/reception of a job is performed by handover. Note that handover is a technique in which apparatuses that perform communication exchange, by a short distance communication method, connection information used for communication by a high-speed communication method, and then, switch the method to the high-speed communication method to transmit/receive data. In this embodiment, BLE is used as the short distance communication method, and Wi-Fi is used as the high-speed communication method. The communication speed of GATT communication (bidirectional communication that can be performed by establishing BLE connection between apparatuses) is lower than that of Wi-Fi communication. Hence, in the GATT communication, exchange of connection information for authentication between the apparatuses or Wi-Fi communication is performed, and data (here, a job) of a large capacity is transferred by Wi-Fi communication with a high communication speed, thereby performing efficient data transfer. Note that the communication method used in handover is not limited to the above-described form, and various communication methods can be used as the short distance communication method and the high-speed communication method. For example, connection information for Wi-Fi communication may be exchanged by NFC communication or Wi-Fi Aware communication, and after that, data exchange may be performed by Wi-Fi communication.

Note that processing of the communication apparatus 151 shown in this processing sequence is implemented when the CPU 154 loads a control program stored in the ROM 152 or the HDD (not shown) provided in the communication apparatus 151 into the RAM 153 and executes the control program. Additionally, processing of the information processing apparatus 101 shown in this processing sequence is implemented when the CPU 103 loads a control program stored in the ROM 104 or the HDD (not shown) provided in the information processing apparatus 101 into the RAM 105 and executes the control program.

In the following description, the communication apparatus 151 is assumed to be an advertiser that transmits advertisement information at a predetermined interval. The information processing apparatus 101 is assumed to be a scanner that waits for advertisement information transmitted from an advertiser on the periphery. First, the short distance wireless communication unit 157 transmits advertisement information (steps S1001 to S1003). The information processing apparatus 101 can recognize the existence of the communication apparatus 151 when the short distance wireless communication unit 110 receives the advertisement information transmitted from the short distance wireless communication unit 157.

When recognizing the communication apparatus 151 and deciding to connect the communication apparatus 151, the information processing apparatus 101 transmits connection request information to the communication apparatus 151. More specifically, the short distance wireless communication unit 110 transmits CONNECT_REQ that is a request to transition to a connection event for establishing network connection by BLE (step S1004). When the short distance wireless communication unit 157 receives CONNECT_REQ, the information processing apparatus 101 and the communication apparatus 151 prepare for transition to the connection event. More specifically, the short distance wireless communication unit 110 and the short distance wireless communication unit 157 notify the CPU 103 and the CPU 154, respectively, that the connection processing for GATT communication is completed. After that, the information processing apparatus 101 and the communication apparatus 151 transition from the scanner and the advertiser to a master and a slave, respectively, and the information processing apparatus 101 that is the master and the communication apparatus 151 that is the slave establish connection (BLE connection) for GATT communication. Note that in the BLE standard, a master can form a "one-to-multiple" star topology with slaves. When BLE connection is established, the information processing apparatus 101 and the communication apparatus 151 can perform data communication by the GATT communication method from then on. Note that GATT communication is communication performed using a GATT profile after BLE connection is established, and is communication performed via the short distance wireless processing unit of each apparatus. In addition, when BLE connection is established, the communication apparatus 151 may stop advertisement or may switch the contents of advertisement information to be transmitted. More specifically, the communication apparatus 151 may switch from advertisement information (ADV_IND) that allows the apparatus that has received the advertisement information to transmit a connection request to advertisement information (ADV_SCAN_IND or ADV_NONCONN_IND) that does not allow the apparatus that has received the advertisement information to transmit a connection request.

After that, in step S1005, the short distance wireless communication unit 110 requests the information of a communication protocol usable by the communication apparatus 151 from the short distance wireless communication unit 157.

This request includes the information of a communication protocol usable by the information processing apparatus 101. By receiving the request, the short distance wireless communication unit 157 can recognize that the information processing apparatus 101 can use a communication method such as Wi-Fi. In step S1006, the short distance wireless communication unit 157 returns the information of a communication protocol usable by itself as a response to the request received in step S1005. This allows the apparatuses to grasp the communication protocols usable by them other than BLE.

Here, assume that the information processing apparatus 101 decides to switch the communication between the apparatuses to Wi-Fi communication by grasping a communication protocol usable by the apparatuses other than BLE. Note that at this time, the communication apparatus 151 may decide whether to switch the communication method. If it is decided to switch the communication method, in steps S1007 and S1008, the apparatuses exchange communication information necessary for performing communication by Wi-Fi, such as the information of an address for identifying the communication partner and the information of an SSID. After that, in step S1009, the short distance wireless communication unit 110 transmits a request (communication switching request) to switch the communication method between the apparatuses from GATT communication to Wi-Fi communication. Upon receiving the switching request, the short distance wireless communication unit 157 returns a response in step S1010.

If the switching request and the response have correctly been done, in step S1011, the information processing apparatus 101 switches the communication unit to be used for communication with the communication apparatus 151 from the short distance wireless communication unit 110 to the communication unit 109. Furthermore, in step S1012, the communication apparatus 151 switches the communication unit to be used for communication with the information processing apparatus 101 from the short distance wireless communication unit 157 to the communication unit 156. After the switching is done, in step S1013, the short distance wireless communication unit 110 transmits a release request. The short distance wireless communication unit 157 that has received the release request transmits a release response in step S1014, and ends the BLE connection between the apparatuses. When the BLE connection between the apparatuses has ended, the information processing apparatus 101 and the communication apparatus 151 return to the scanner and the advertiser, respectively, and the short distance wireless communication unit 157 resumes transmission of advertisement information.

After that, the apparatuses perform Wi-Fi communication using the information necessary for performing Wi-Fi communication, which is exchanged in steps S1007 and S1008. First, in step S1015, the communication unit 109 confirms with the communication unit 156 whether the communication apparatus 151 can acquire a job. Here, for example, the information of a free space used to temporarily store an image to be transferred to the communication apparatus 151, or the like is confirmed. After the confirmation request is received, in step S1016, the communication unit 156 transmits a response to the confirmation.

If a correct response is obtained, and it is judged that the communication apparatus 151 can acquire a job, the communication unit 156 requests a job in step S1017. After that, in step S1018, the communication unit 109 that has received the job request transmits a job including image data or the like existing in the information processing apparatus 101 to the communication unit 156. Note that selection of the job to be transmitted at this time is performed at a timing, for example, before BLE connection is established, after BLE connection is established, or after Wi-Fi communication is established. The job to be transmitted is not limited to a print job, and may be, for example, a scan job to instruct the communication apparatus 151 to do scan or a job used by the information processing apparatus 101 to acquire the information of the state of the communication apparatus 151. Alternatively, for example, a command used to execute various kinds of operations for the communication apparatus 151, such as change of the settings of the communication apparatus 151 may be used. Note that if transmission of the job is completed, the information processing apparatus 101 disconnects the Wi-Fi communication with the communication apparatus 151 and returns to the network state immediately before the handover. More specifically, for example, if the information processing apparatus 101 was connected to a mobile communication network such as 3G or LTE or an access point such as a router before execution of handover, connection to the mobile communication network or the access point is reestablished. Hence, before execution of handover, the information processing apparatus 101 holds the information of the network state immediately before the handover and communication information necessary for establishing the network information.

In this way, by using the handover technique, connection information used to communicate by a high-speed communication method can be exchanged by a communication method (short distance communication method) of high usability, and after that, data of a large capacity can be exchanged by a high-speed communication method.

Note that when the communication method is switched from GATT communication to Wi-Fi communication by handover, the BLE connection between the apparatuses is disconnected, and therefore, the short distance wireless communication unit 157 resumes transmission of advertisement information.

As described above, the methods of the information processing apparatus 101 to detect the direction of the communication apparatus 151 include a method implemented when the information processing apparatus 101 includes a plurality of antennas, and a method implemented when the communication apparatus 151 includes a plurality of antennas. In both methods, to calculate the direction, the information processing apparatus 101 needs an inter-antenna distance d (the distance between the plurality of antennas on the transmitting side or the distance between the plurality of antennas on the receiving side) as information. If the short distance wireless communication unit 110 included in the information processing apparatus 101 includes a plurality of antennas, the information processing apparatus 101 can hold the AoA inter-antenna distance d 701, which is the distance between the antenna 601 and the antenna 602 included in the short distance wireless communication unit 110, in advance as information. On the other hand, if the short distance wireless communication unit 157 included in the communication apparatus 151 includes a plurality of antennas, since the AoD inter-antenna distance d 801 that is the distance between the antenna 604 and the antenna 605 changes depending on the device, it is impossible to hold the information of all devices in advance. If the communication apparatus 151 as the detection target is known in advance, the information processing apparatus 101 can register the AoD inter-antenna distance d 801 in advance. In this case, the information processing apparatus 101 cannot correctly detect the direction of the arbitrary communication apparatus 151 with a different antenna arrangement.

This embodiment proposes a method of allowing the information processing apparatus 101 to detect the direction of the arbitrary communication apparatus 151 whose antenna arrangement information is not held in advance. More specifically, the communication apparatus 151 transmits the AoD signal 803 including antenna layout information that is information concerning the arrangement of the antennas of the short distance wireless communication unit 157, and the information processing apparatus 101 uses the information to detect the direction of the communication apparatus 151. It is considered that the antenna layout information is included in advertisement information existing in the AoD signal 803. However, the present invention is not limited to this. If the communication apparatus 151 includes only two antennas, only the information of the AoD inter-antenna distance suffices as the arrangement information of the antennas. However, the number of antennas provided in the short distance wireless communication unit 157 is not limited to two, as described above. When the number of antennas is increased, measurement data increases, and more accurate detection is possible. As for the antenna arrangement method, not only an arrangement on a straight line but also an arrangement on a plane can also be considered. In this state, not only the distance between antennas but also a parameter (layout information) representing how the plurality of antennas are arranged is necessary.

FIG. 14 shows an example of antenna layout information included in advertisement information. In the antenna layout information shown in FIG. 14, "Identifier" represents the start of the antenna layout information. "Length" represents the size of the antenna layout information. "Type" represents rules to arrange antennas. In FIG. 14, definitions are made for a case in which antennas are evenly arranged on a straight line and a case in which antennas are evenly arranged on a plane. However, available antenna layouts are not limited to these. Each of "XCount" and "YCount" represents the number of antennas. Since an antenna arrangement on a plane is assumed, information can be stored in two directions. If only an antenna arrangement on a straight line is assumed, information only in one direction may suffice. If a three-dimensional antenna arrangement is assumed, it is considered that pieces of information in three directions can be stored. "Unit" represents the unit of the size information stored in the antenna layout information. "XLength" and "YLength" represent the size information of the area where the antennas are located. The size of the area where the antennas are located is decided together with the above-described "Unit". Note that as for the size information as well, necessary information need only be stored in accordance with the assumed antenna layout, and the size information is not limited to this configuration.

FIGS. 15A and 15B are views showing the antenna arrangement decided based on the antenna layout information shown in FIG. 14. Note that in this embodiment, each information in the layout information is expressed by 1 byte. However, the present invention is not limited to this. If the data size used for each information is made large, more accurate layout information can be notified. However, other pieces of information that can be included in the advertisement information decrease. Reversely, if the data size used for each information is made small, the accuracy of layout information lowers. However, other pieces of information that can be included in the advertisement information increase.

FIG. 15A shows an example of antenna layout information in a case in which the antennas are evenly arranged on a straight line in the short distance wireless communication unit 157 of the communication apparatus 151. The antenna layout information is 0xFF060003011E. The first byte corresponds to "Identifier" in the antenna layout information shown in FIG. 14, which is an identifier representing the start of the layout information. Here, the identifier is assumed to be 0xFF. The second byte corresponds to "Length" in the antenna layout information shown in FIG. 14, which is information representing the size of the layout information. FIG. 15A shows that six bytes are used, including the identifier. The third byte corresponds to "Type" in the antenna layout information shown in FIG. 14, which represents the arrangement pattern of the antennas, and shows, by designating 0x00, that the antennas are evenly arranged on a straight line. The fourth byte corresponds to "XCount" in the antenna layout information shown in FIG. 14, which shows that the number of antennas is three. Note that in FIG. 15A, 0 is designated as Type, and it is known that the antennas are linearly arranged. Hence, "YCount" is omitted. However, if the antenna layout information should be defined as predetermined size information, "YCount" may be designated even in the case in which the antennas are arranged on a straight line. The fifth byte corresponds to "Unit" in the antenna layout information shown in FIG. 14, which represents the unit of size information designated in the antenna layout information. Here, 1 is designated to show that the size information is information of a unit of 1 mm. The sixth byte corresponds to "XLength" in the antenna layout information shown in FIG. 14, which includes the size information of the area where the antennas are located, and represents the range where the antennas exist together with the above-described unit information. Here, 0x1E(30) is designated to represent 30 mm together with the above-described unit information. "YLength" is omitted, like the above-described "YCount". If the antenna layout information should be defined as predetermined size information, "YLength" may be designated without being omitted even in the case in which the antennas are arranged on a straight line. That is, it is found by the information that three antennas are arranged on a 30-mm straight line, and the interval between the antennas is 15 mm.

FIG. 15B shows an example of antenna layout information in a case in which the antennas are evenly arranged on a plane in the short distance wireless communication unit 157 of the communication apparatus 151. The antenna layout information is 0xFF08010403011E0A. "Identifier" of the first byte is the same as in FIG. 15A. "Length" of the second byte represents that the size of the antenna layout information is 8 bytes. The size is large because the pieces of information "YCount" and "YLength" are also stored in addition to FIG. 15A. As "Type" of the third byte, 0x01 is designated to show that the antennas are evenly planarly arranged. Each of "XCount" of the fourth byte and "YCount" of the fifth byte represents the number of arranged antennas. 0x04 is designated as "Xcount", and 0x03 is designated as "YCount" to show that 4×3=12 antennas are arranged. "Unit" of the sixth byte is the same as in FIG. 15A, and shows that the size information included in the antenna layout information is a unit of 1 mm "XLength" of the seventh byte and "YLength" of the eighth byte represent the size information of the area where the antennas are located. 0x1E(30) is designated as XLength, and 0x0A(10) is designated as YLength to show that the antennas are arranged within the range of 30 mm×10 mm together with the above-described "Unit". That is, it is found by the information that 4×3=12 antennas are arranged within the range of 30 mm×10 mm, and the interval between the antennas is 10 mm in the X direction and 5 mm in the Y direction.

As described above, when the communication apparatus 151 notifies the information processing apparatus 101 of the antenna layout information of the short distance wireless communication unit 157 of its own, the information processing apparatus 101 can detect the direction of the communication apparatus 151 (the angle between the information processing apparatus 101 and the communication apparatus 151) using the received antenna layout information. Hence, the position information of the communication apparatus 151 is identified based on the information of the distance between the information processing apparatus 101 and the communication apparatus 151, which is obtained based on the intensity of advertisement information, and the information concerning the angle between the information processing apparatus 101 and the communication apparatus 151, which is obtained using the antenna layout information.

Second Embodiment

In the first embodiment, a method has been described, in which antenna layout information is included in advertisement information held by the AoD signal 803 transmitted from the communication apparatus 151, whereby the information processing apparatus 101 acquires the antenna layout information of the short distance wireless communication unit 157 and detects the direction of the communication apparatus 151. However, the advertisement information transmitted from the communication apparatus 151 has a size limit, and information can be stored only within the range of a predetermined size. For this reason, if the communication apparatus 151 uses a large part of the predetermined size for information other than the antenna layout information, it is considered that the size needed for the antenna layout information cannot be ensured. Hence, in the second embodiment, a method of dividing antenna layout information into a plurality of parts and transmitting them will be described.

As described above, for the transmission/reception of advertisement information, a mechanism is considered in which if a scan request for advertisement information is received from an information processing apparatus 101, second advertisement information different from first advertisement information is transmitted as a scan response. In this embodiment, antenna arrangement information that is different from the first advertisement information is stored in the second advertisement information and transmitted. The information processing apparatus 101 uses, as antenna layout information, antenna layout information included in the first advertisement information and antenna layout information included in the second advertisement information together. When the information is stored in two different pieces of advertisement information and transmitted, the information processing apparatus 101 can acquire information beyond the size information of single advertisement information.

FIGS. 16A and 16B show an example of antenna layout information stored in first advertisement information and second advertisement information in this embodiment. Antenna layout information 1601 of first advertisement information shown in FIG. 16A includes the information of "Identifier", "Length", "Number", "Type", "XCount", and "YCount". Antenna layout information 1602 of second advertisement information shown in FIG. 16B includes the information of "Identifier", "Length", "Number", "Unit", "XLength", and "YLength". "Identifier" and "Length" are common information needed every time information is stored, and are included in both the first advertisement information and the second advertisement information. "Number" is information representing the order of the information in the antenna layout information that is divided into a plurality of parts. "Type", "XCount", "YCount", "Unit", "XLength", and "YLength" are information representing how the antennas are arranged. "Type", "XCount", and "YCount" are stored in the first advertisement information, and "Unit", "XLength", and "YLength" are stored in the second advertisement information. Hence, even if all pieces of information "Type", "XCount", "YCount", "Unit", "XLength", and "YLength" cannot be stored in the first advertisement information, the information processing apparatus 101 can acquire the antenna layout information of a short distance wireless communication unit 157 using the second advertisement information together.

Note that in this embodiment, the antenna layout information described with reference to FIG. 14 is divisionally stored in two pieces of advertisement information. However, the stored information is not limited to this. It is also considered that the information is notified after divided not into two pieces of advertisement information but into three or more pieces of advertisement information.

Third Embodiment

In the first and second embodiments, a method has been described, in which antenna layout information is included in advertisement information held by the AoD radio signal 803 transmitted from the communication apparatus 151, whereby the information processing apparatus 101 acquires the antenna layout information of the short distance wireless communication unit 157 provided in the communication apparatus 151 and detects the direction. However, the advertisement information transmitted from the communication apparatus 151 has a size limit, and information can be stored only within the range of a predetermined size. If the communication apparatus 151 uses the whole predetermined data size for information other than the antenna layout information, it is considered that the antenna layout information cannot be included in the advertisement information. Hence, in the third embodiment, a method will be described, in which in a case in which antenna layout information cannot be acquired from a communication apparatus 151, an information processing apparatus 101 estimates the antenna layout of the communication apparatus 151 without having preliminary knowledge concerning the antenna layout of a short distance wireless communication unit 157 provided in the communication apparatus 151. More specifically, the information processing apparatus 101 performs measurement at a plurality of points while moving antennas and estimates an antenna layout in which the communication apparatus 151 is located at the same position.

Figure 17:
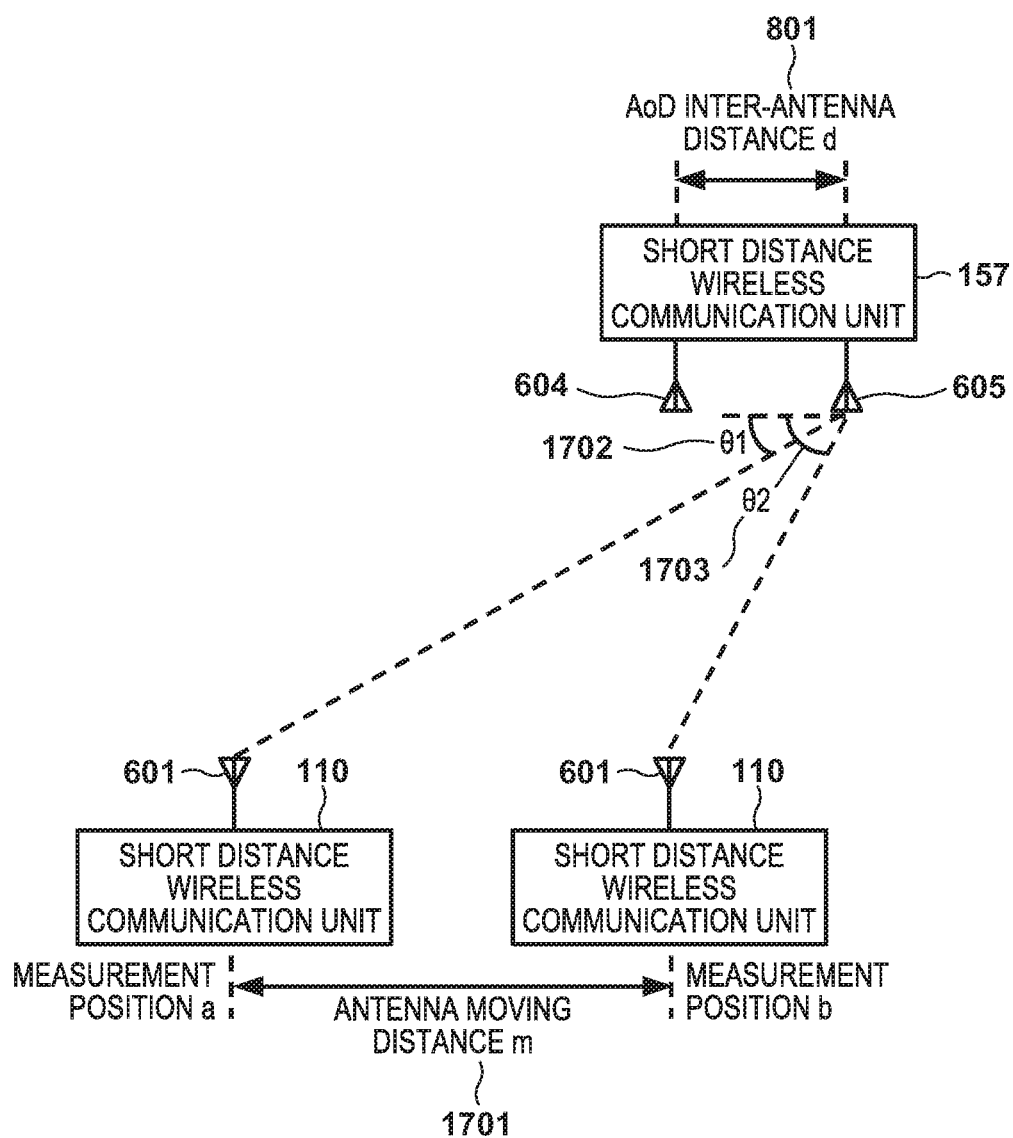
FIG. 17 is a view showing an arrangement for deciding an antenna layout by position measurement of a plurality of points.
Figure 18:
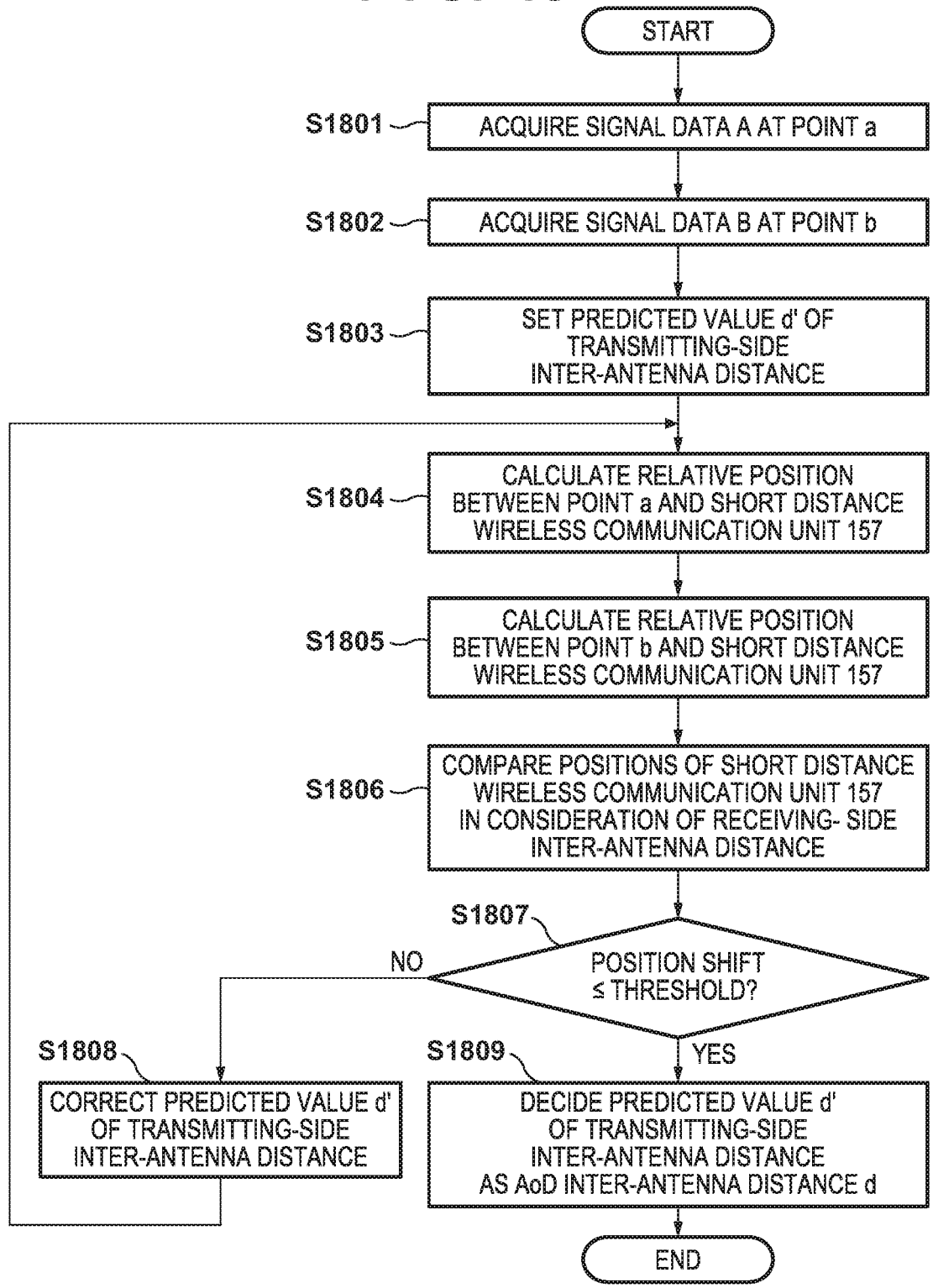
FIG. 18 is a flowchart of processing of deciding an antenna layout by position measurement of a plurality of points.

A method will be described with reference to FIGS. 17 and 18, in which while moving, a short distance wireless communication unit 110 receives, at a plurality of points, an AoD radio signal 803 transmitted from the short distance wireless communication unit 157 provided in the communication apparatus 151, and decides an AoD inter-antenna distance d 801 of the short distance wireless communication unit 157. First, the short distance wireless communication unit 110 receives a signal from the short distance wireless communication unit 157 at a measurement position a, and the information processing apparatus 101 stores signal data A (step S1801). Next, the short distance wireless communication unit 110 moves to a measurement position b and similarly receives a signal from the short distance wireless communication unit 157, and the information processing apparatus 101 stores signal data B (step S1802). Additionally, the information processing apparatus 101 stores an antenna moving distance m 1701 that is a moving amount from the measurement position a to the measurement position b. To move the short distance wireless communication unit 110, a method of moving the information processing apparatus 101 itself, a method of moving only the short distance wireless communication unit 110 inside the information processing apparatus 101, and the like are considered. That is, even if the information processing apparatus 101 does not move, the movement of antennas in the device can occur. As for the movement of the short distance wireless communication unit 110, an inter-antenna distance in a case in which the short distance wireless communication unit includes a plurality of antennas and in a case in which the information processing apparatus 101 does not move, and the antenna used to receive the AoD radio signal 803 is changed is also included in the antenna moving distance. The movement of the short distance wireless communication unit 110 can be measured using, by the information processing apparatus 101, at least one of a Global Positioning System (GPS) sensor, a geomagnetic sensor, and an acceleration sensor.

When the measurement at the plurality of points by the short distance wireless communication unit 110 has ended, the information processing apparatus 101 defines a predicted value d' of the AoD inter-antenna distance d 801 that is the distance between the plurality of antennas on the transmitting side, that is, in the communication apparatus 151 (step S1803). Using the predicted value d', the information processing apparatus 101 calculates the relative position of the short distance wireless communication unit 157 from each point. First, the information processing apparatus 101 calculates the relative position of the short distance wireless communication unit 157 from the measurement position a using a direction θ1 1702 from the measurement position a calculated by the direction detection method described with reference to FIG. 8 and distance information calculated from the signal strength included in the signal data A (step S1804). Similarly, the information processing apparatus 101 calculates the relative position of the short distance wireless communication unit 157 from the measurement position b using a direction θ2 1703 from the measurement position b and distance information calculated from the signal strength included in the signal data B (step S1805). Based on the calculated relative positions from the points, and the antenna moving distance m 1701 that is the distance between the measurement position a and the measurement position b, the information processing apparatus 101 judges whether the position of the short distance wireless communication unit 157 decided from the measurement result from the measurement position a and the position of the short distance wireless communication unit 157 decided from the measurement result from the measurement position b match (step S1806). If it is judged in step S1807 that the positions do not match (NO in step S1807), the information processing apparatus 101 corrects the predicted value d' of the inter-antenna distance (step S1808), and performs the processes of steps S1804 to S1807 using the corrected predicted value d'. As the correction method of the predicted value d', a method of simply increasing/decreasing the value, a method of creating a learning model, and calculating the corrected predicted value d' using a preceding calculation result as an input, and the like are considered. If it is judged in step S1807 that the positions of the short distance wireless communication unit 157 calculated from the measurement data of the measurement positions a and b match (YES in step S1807), the current predicted value d' of the inter-antenna distance is employed as the inter-antenna distance d 801 of the short distance wireless communication unit 157 (step S1809) and used in subsequent measurement. With this arrangement, even if antenna layout information cannot be obtained from the communication apparatus 151, the information processing apparatus 101 can detect the direction without having preliminary knowledge concerning the antenna layout of the short distance wireless communication unit 157 provided in the communication apparatus 151. Note that in this embodiment, a case in which the short distance wireless communication unit 157 includes two antennas has been exemplified. It is also considered that the short distance wireless communication unit 157 includes three or more antennas.

In the method according to this embodiment, the information processing apparatus 101 decides the antenna layout on condition that the short distance wireless communication unit 157 is located, as the result of calculation from the plurality of points, at the same position. Hence, to decide the antenna layout of the short distance wireless communication unit 157 by the information processing apparatus 101, the short distance wireless communication unit 157 needs to exist at the same position during the measurement by the plurality of points by the information processing apparatus 101. However, it is also considered that if the communication apparatus 151 is not a fixed device, the short distance wireless communication unit 157 provided in the communication apparatus 151 does not exist at the same position during the measurement period. In this case, the antenna layout decided by the above-described method is different from the actual antenna layout of the short distance wireless communication unit 157. Hence, it is considered that to confirm whether the communication apparatus 151 is a fixed device, measurement at the same point is performed a plurality of times, and if the measurement data does not change within a predetermined range, the communication apparatus 151 is judged as a fixed device, and measurement is started after movement. A method is also considered in which the information processing apparatus 101 returns to the first measurement position after the measurement at the plurality of points, confirms the differences from the first measurement to judge whether the communication apparatus 151 was located at the same position, and judges that the measurement data during that time is usable.

Fourth Embodiment

In the first and second embodiments, a method has been described, in which antenna layout information is included in advertisement information held by the AoD radio signal 803 transmitted from the communication apparatus 151, whereby the information processing apparatus 101 acquires the antenna layout information of the short distance wireless communication unit 157 provided in the communication apparatus 151 and detects the direction. In the third embodiment, a method has been described, in which the information processing apparatus 101 performs measurement while moving the short distance wireless communication unit 110, and decides, from the measurement data at the plurality of points, an antenna layout in which the positions of the short distance wireless communication unit 157 match.

The advertisement information transmitted from the communication apparatus 151 has a size limit, and information that can be included in it is limited. On the other hand, various layouts are possible as the antenna arrangement method, and it is difficult to express all of them in limited information. Hence, the fourth embodiment proposes a method of including antenna layout information in advertisement information transmitted from a communication apparatus 151, as in the first embodiment, and using the information to decide a predicted value d' of an inter-antenna distance d in the third embodiment.

For example, the antenna layout information shown in FIG. 14 assumes that the antennas are evenly arranged. In fact, it is considered that the distance between adjacent antennas is different. In this case as well, if the number of arranged antennas or the size information of the area where the antennas are located can be acquired, the possibility that a corrected value can be derived by a smaller number of attempts in the definition of the predicted value d' in step S1803 or correction of the predicted value d' in step S1808 becomes high. More specifically, since the maximum value of the inter-antenna distance is decided by acquiring the information of the area where the antennas are located, the range of the value the predicted value d' can take can be narrowed. That is, in the method according to the third embodiment, the position estimation accuracy can be improved by further using the antenna layout information transmitted from the communication apparatus 151.

Fifth Embodiment

In the fifth embodiment, a communication apparatus 151 transmits antenna layout information by GATT communication. As described above, advertisement information transmitted from the communication apparatus 151 has a size limit, and information can be stored only within the range of a predetermined size. Hence, in this embodiment, after advertisement information is received, and before position estimation, an information processing apparatus 101 establishes BLE connection with the communication apparatus 151 and executes GATT communication. The information processing apparatus 101 then requests antenna layout information from the communication apparatus 151 by GATT communication and acquires a signal including the antenna layout information from the communication apparatus 151.

When the antenna layout information is received, the information processing apparatus 101 transmits a release request of GATT communication to the communication apparatus 151. The communication apparatus 151 that has received the release request transmits a release response, and ends the BLE connection between the apparatuses.

When the BLE connection between the apparatuses has ended, the information processing apparatus 101 and the communication apparatus 151 return to the scanner and the advertiser, respectively, and the communication apparatus 151 resumes transmission of advertisement information. The information processing apparatus 101 can thus obtain the direction of the communication apparatus 151 using the layout information acquired previously.

According to this embodiment, even in a case in which the advertisement information has no size area to include antenna layout information, since the antenna layout information can be acquired by GATT communication, a position can be estimated. Additionally, since GATT communication in a state in which pairing has been done is communication of high confidentiality, even antenna layout information of high confidentiality can be transmitted.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-103173, filed on May 31, 2019, which is hereby incorporated by reference herein in its entirety.

What is claimed is:

1. An information processing apparatus configured to execute communication with a communication apparatus including a plurality of antennas, comprising:
at least one processor; and
at least one memory storing instructions that, when executed by the at least one processor, perform the functions of
a communication unit configured to receive a signal transmitted from each of the plurality of antennas of the communication apparatus;
an acquisition unit configured to acquire information concerning a distance between the plurality of antennas of the communication apparatus, which is included in the received signal; and
an identifying unit configured to identify information concerning an angle between the information processing apparatus and the communication apparatus based on the acquired information concerning the distance between the plurality of antennas,
wherein at least one of a first signal transmitted from a first antenna in the plurality of antennas and a second signal transmitted from a second antenna includes information concerning an arrangement of the plurality of antennas, and
the acquisition unit acquires the information concerning the distance between the plurality of antennas based on the information concerning the arrangement included in at least one of the first signal and the second signal.

2. The information processing apparatus according to claim 1, wherein the identifying unit identifies position information of the communication apparatus based on the information concerning the angle.

3. The information processing apparatus according to claim 1, wherein the information concerning the arrangement includes information concerning at least one of an arrangement pattern of the antennas, the number of antennas arranged in one direction, and a length of an area where the antennas are located.

4. The information processing apparatus according to claim 1, wherein each of the first signal and the second signal includes different information as the information concerning the arrangement.

5. The information processing apparatus according to claim 1, wherein the communication unit receives, at a first position, the first signal transmitted from the first antenna in the plurality of antennas and the second signal transmitted from the second antenna, and receives the first signal and the second signal at a second position different from the first position,
the acquisition unit acquires the information concerning the distance between the plurality of antennas based on a reception result at the first position, a reception result at the second position, and a distance between the first position and the second position, and
the identifying unit specifies the information concerning the angle based on the information concerning the distance between the plurality of antennas, the first signal, and the second signal.

6. The information processing apparatus according to claim 5, wherein the acquisition unit acquires the distance between the first position and the second position based on values of an acceleration sensor, a sensor of a Global Positioning System, and a geomagnetic sensor.

7. The information processing apparatus according to claim 5, wherein the communication unit further performs the function of a moving unit configured to move, in a device, at least one antenna of the plurality of antennas from the first position to the second position, and
the acquisition unit acquires the distance between the first position and the second position based on a moving amount of the at least one antenna by the moving unit.

8. The information processing apparatus according to claim 1, wherein the communication unit receives the information concerning the arrangement of the plurality of antennas by communication performed by establishing connection between the communication apparatus and the information processing apparatus, and
the acquisition unit acquires the information concerning the distance between the plurality of antennas based on the information concerning the arrangement of the plurality of antennas.

9. The information processing apparatus according to claim 1, wherein the communication unit includes at least two antennas including the first antenna and the second antenna different from the first antenna,
the communication unit receives the first signal and the second signal using the first antenna, and receives the first signal and the second signal using the second antenna,
the acquisition unit estimates the information concerning the distance between the plurality of antennas based on a reception result received using the first antenna, a reception result received using the second antenna, and a distance between the first antenna and the second antenna, and
the identifying unit specifies the information concerning the angle based on the information concerning the distance between the plurality of antennas, the first signal, and the second signal.

10. The information processing apparatus according to claim 1, wherein the signal transmitted from each of the plurality of antennas is advertisement information based on a Bluetooth5.1 standard.

11. The information processing apparatus according to claim 1, wherein a reception result of the signal includes at least one of a propagation delay and a propagation loss of the signal transmitted from at least one of the plurality of antennas.

12. An information processing method executed by an information processing apparatus configured to execute communication with a communication apparatus including a plurality of antennas, comprising:
   receiving a signal transmitted from each of the plurality of antennas of the communication apparatus;
   acquiring information concerning a distance between the plurality of antennas of the communication apparatus, which is included in the received signal; and
   identifying information concerning an angle between the information processing apparatus and the communication apparatus based on the acquired information concerning the distance between the plurality of antennas,
   wherein at least one of a first signal transmitted from a first antenna in the plurality of antennas and a second signal transmitted from a second antenna includes information concerning an arrangement of the plurality of antennas, and
   the acquiring comprises acquiring the information concerning the distance between the plurality of antennas based on the information concerning the arrangement included in at least one of the first signal and the second signal.

13. A position detection system comprising a communication apparatus and an information processing apparatus, comprising:
   the communication apparatus comprising a first communication unit configured to transmit a signal from each of a plurality of antennas; and
   the information processing apparatus comprising:
   at least one processor; and
   at least one memory storing instructions that, when executed by the at least one processor, perform the functions of
      a second communication unit configured to receive the signal transmitted from each of the plurality of antennas of the communication apparatus;
      an acquisition unit configured to acquire information concerning a distance between the plurality of antennas of the communication apparatus, which is included in the received signal; and
      an identifying unit configured to identify information concerning an angle between the information processing apparatus and the communication apparatus based on the acquired information concerning the distance between the plurality of antennas,
   wherein at least one of a first signal transmitted from a first antenna in the plurality of antennas and a second signal transmitted from a second antenna includes information concerning an arrangement of the plurality of antennas, and
   the acquisition unit acquires the information concerning the distance between the plurality of antennas based on the information concerning the arrangement included in at least one of the first signal and the second signal.

* * * * *